Oct. 7, 1969    J. O. BURMAN ET AL    3,470,599
HINGE ATTACHING APPARATUS
Filed May 19, 1967    21 Sheets-Sheet 1

INVENTORS.
JOSEPH O. BURMAN
LOUIS L. DESROSIERS
BY
Kenway, Jenney & Hildreth
ATTORNEYS INVENTORS.
JOSEPH O. BURMAN
LOUIS L. DESROSIERS
BY
Kenway, Jenney + Hildreth
ATTORNEYS Oct. 7, 1969

J. O. BURMAN ET AL 3,470,599

HINGE ATTACHING APPARATUS

Filed May 19, 1967

INVENTORS,
JOSEPH O. BURMAN
LOUIS L. DESROSIERS
BY
Kenway, Jenney + Hildreth

ATTORNEYS

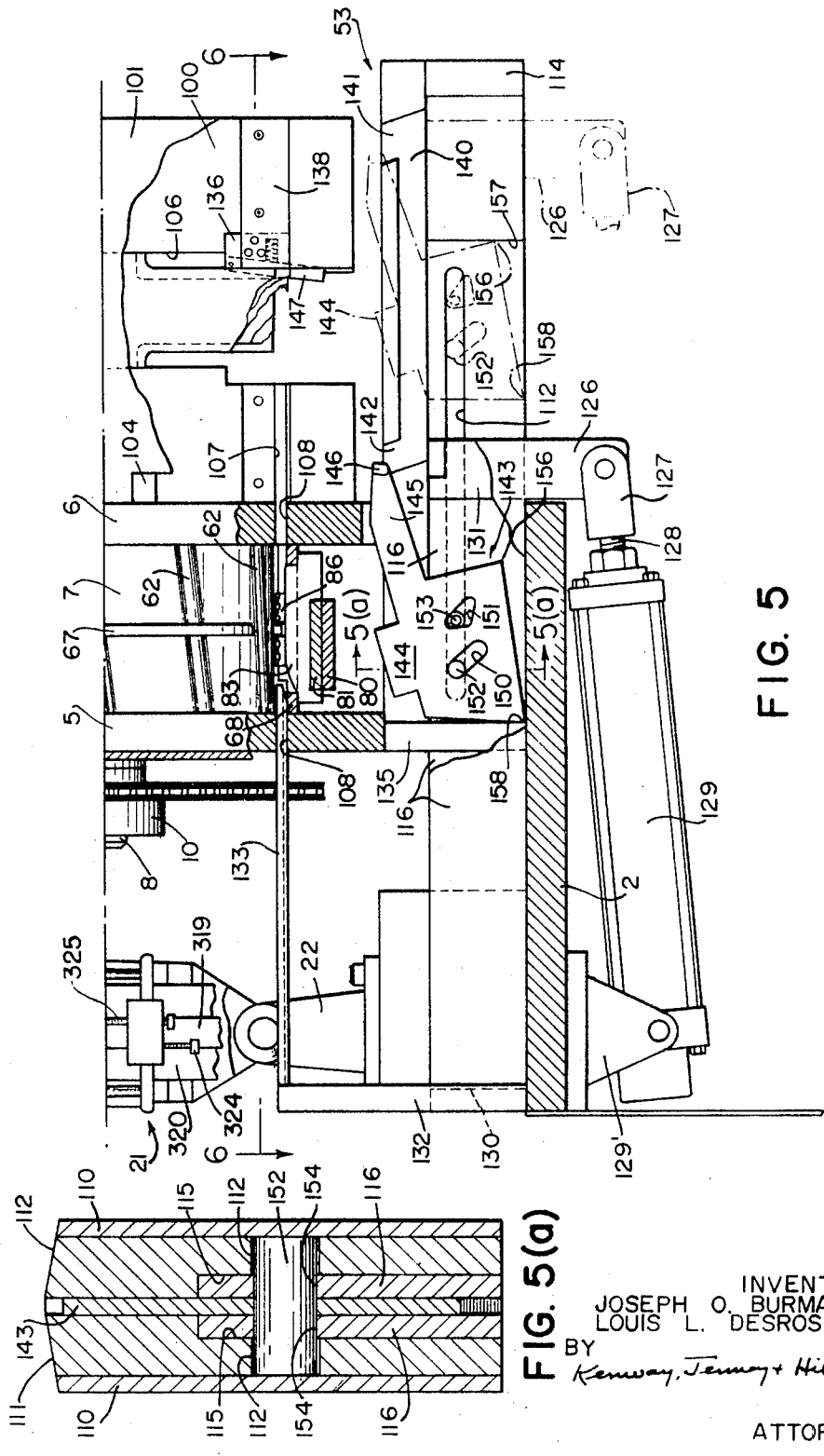

INVENTORS,
JOSEPH O. BURMAN
LOUIS L. DESROSIERS
BY
Kenway, Jenney + Hildreth
ATTORNEYS

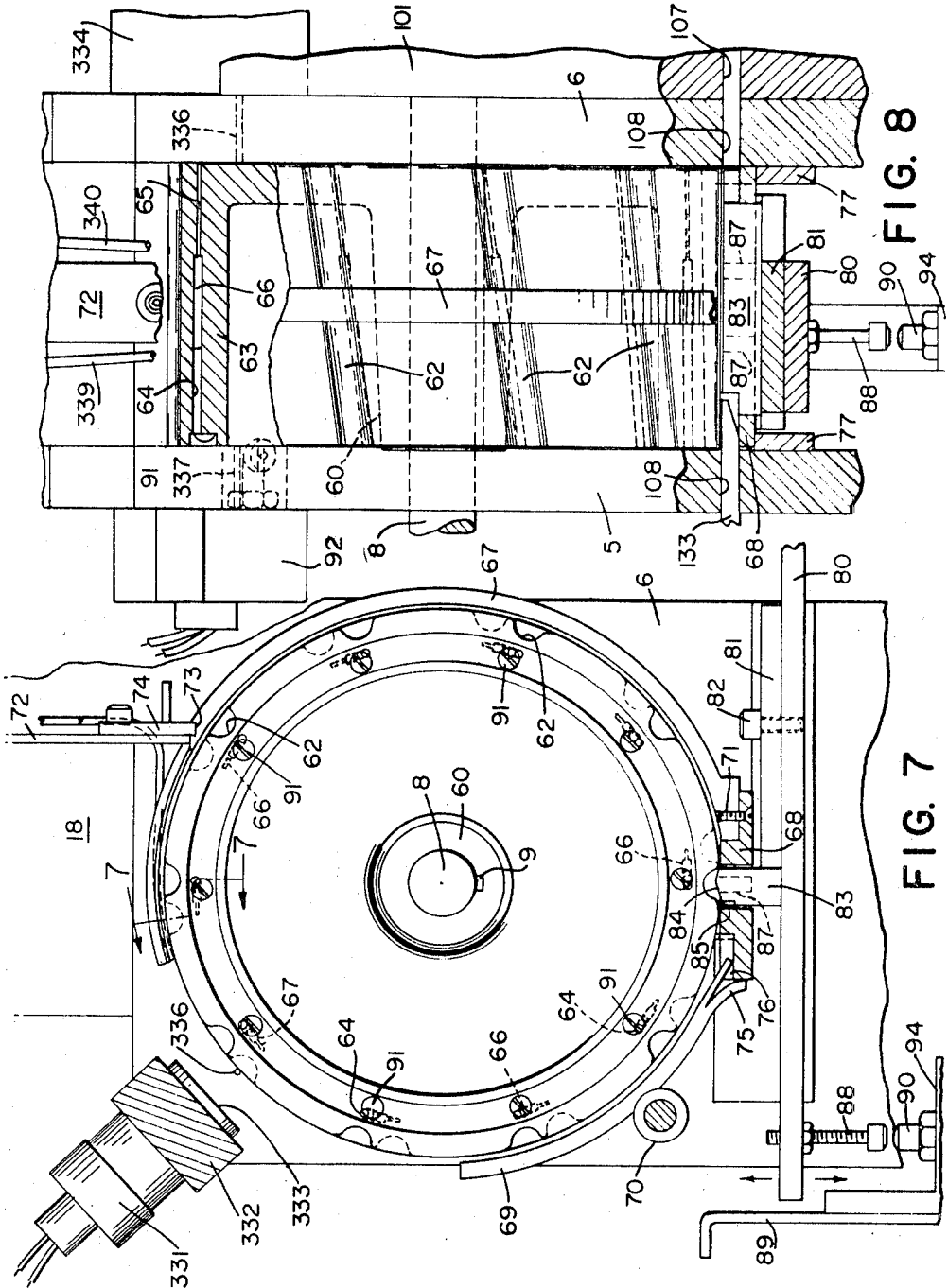

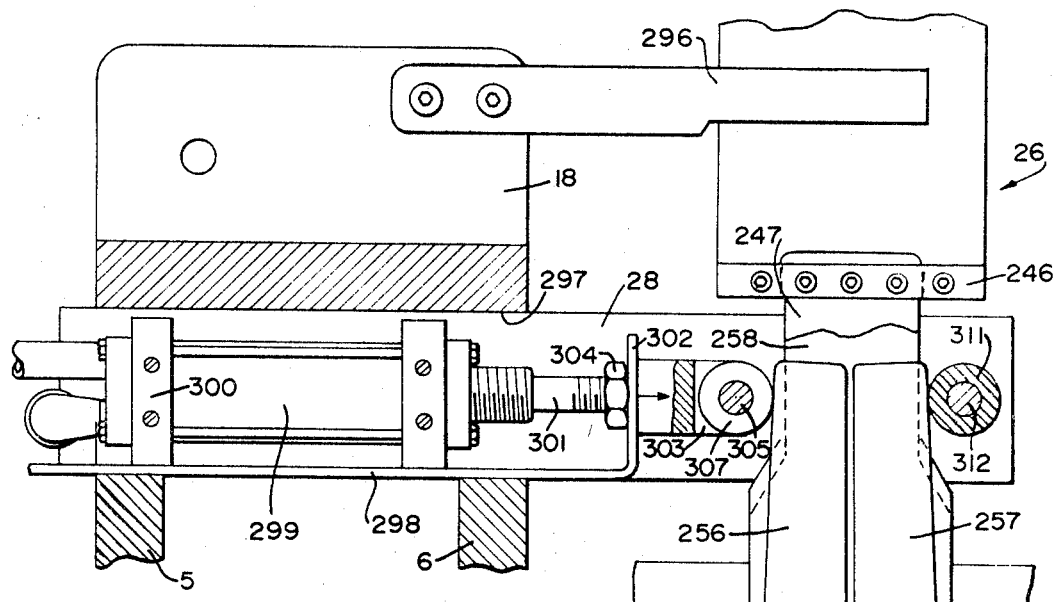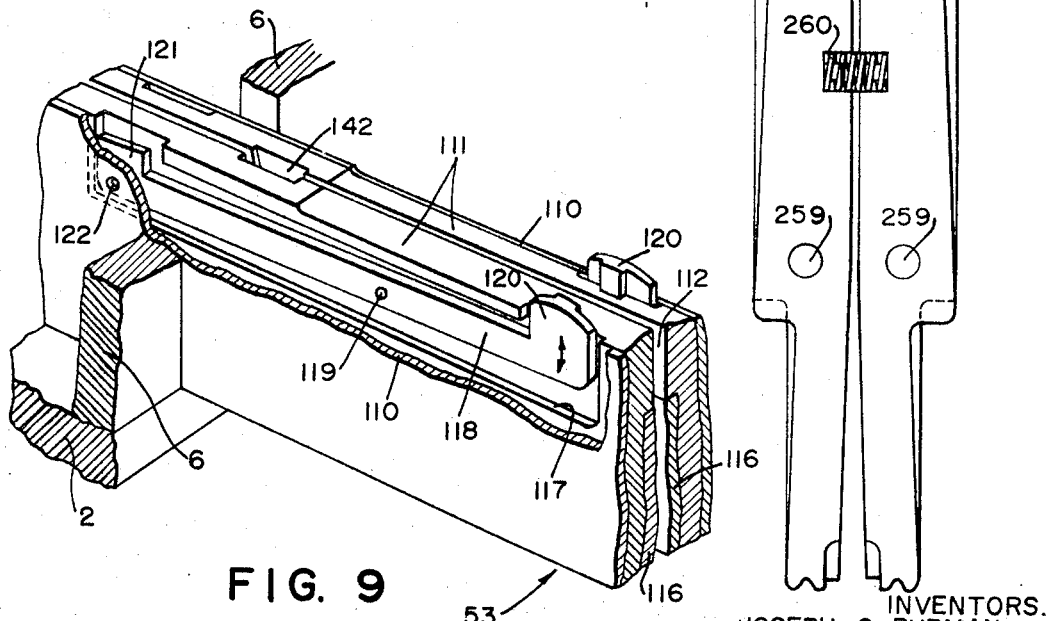

Oct. 7, 1969   J. O. BURMAN ET AL   3,470,599
HINGE ATTACHING APPARATUS

Filed May 19, 1967   21 Sheets-Sheet 10

INVENTORS.
JOSEPH O. BURMAN
LOUIS L. DESROSIERS
BY
Kenway, Jenney & Hildreth
ATTORNEYS Oct. 7, 1969    J. O. BURMAN ET AL    3,470,599
HINGE ATTACHING APPARATUS
Filed May 19, 1967    21 Sheets-Sheet 12

INVENTORS.
JOSEPH O. BURMAN
LOUIS L. DESROSIERS
BY
Kenway, Jenney + Hildreth
ATTORNEYS

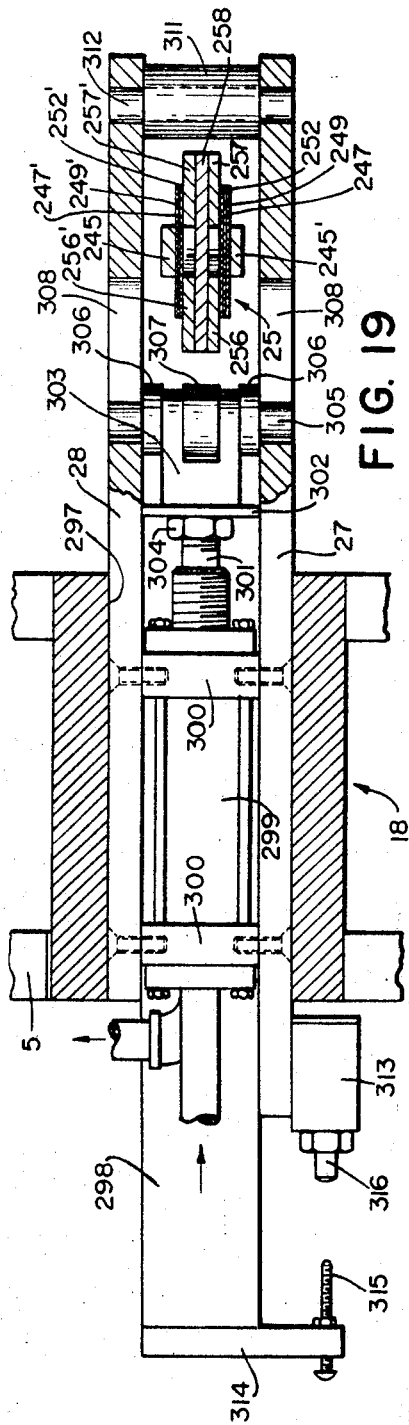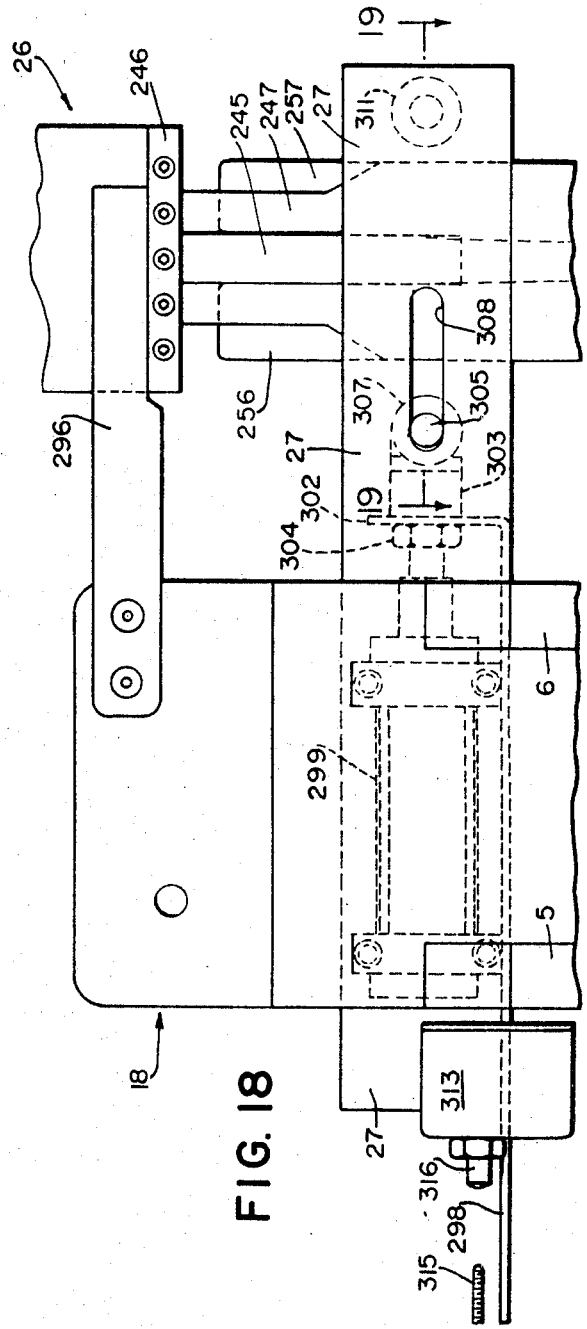

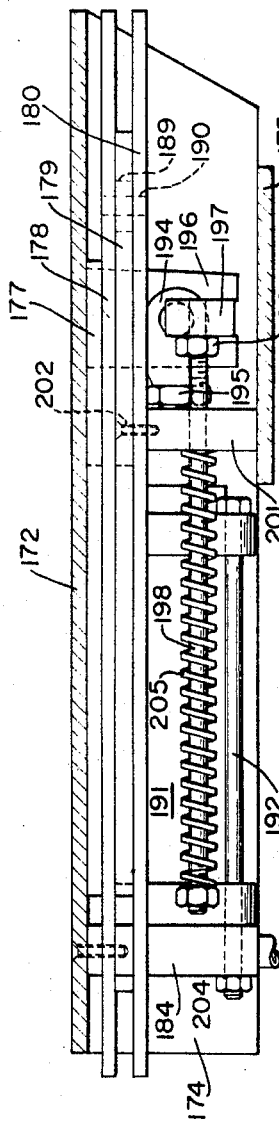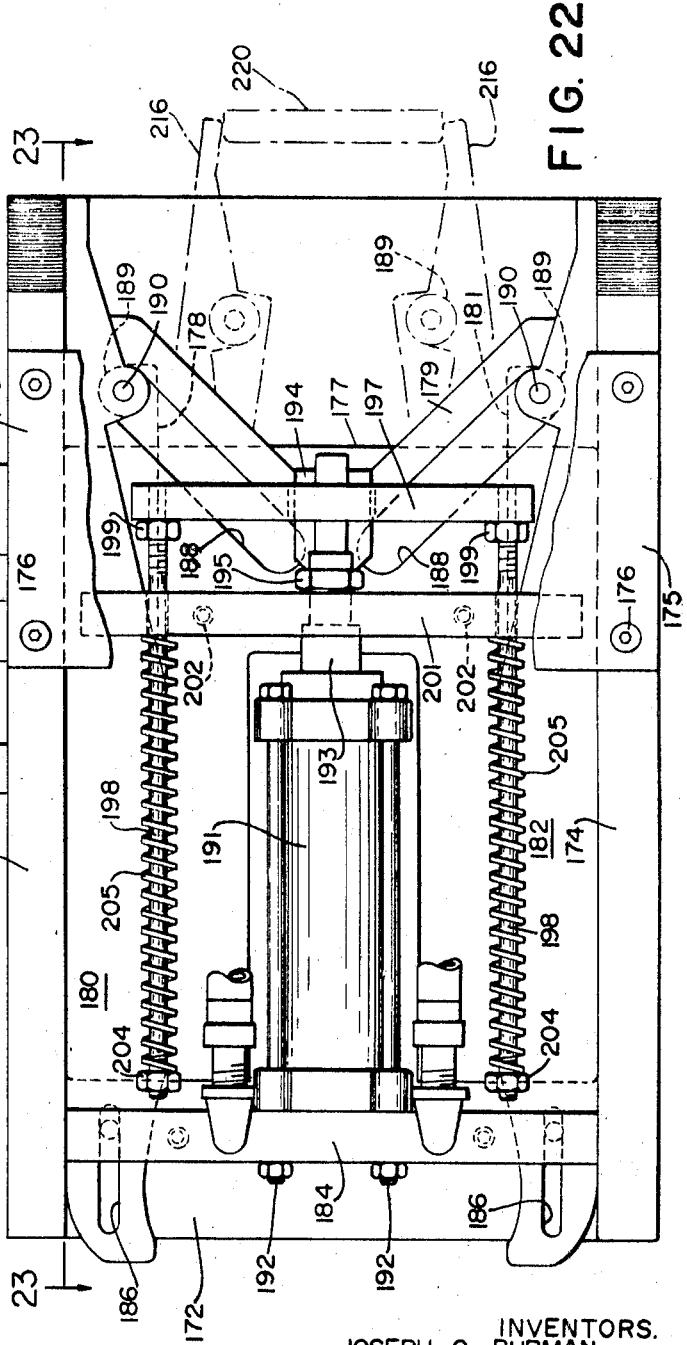

Oct. 7, 1969   J. O. BURMAN ET AL   3,470,599
HINGE ATTACHING APPARATUS
Filed May 19, 1967   21 Sheets-Sheet 17

INVENTORS.
JOSEPH O. BURMAN
LOUIS L. DESROSIERS
BY

ATTORNEYS

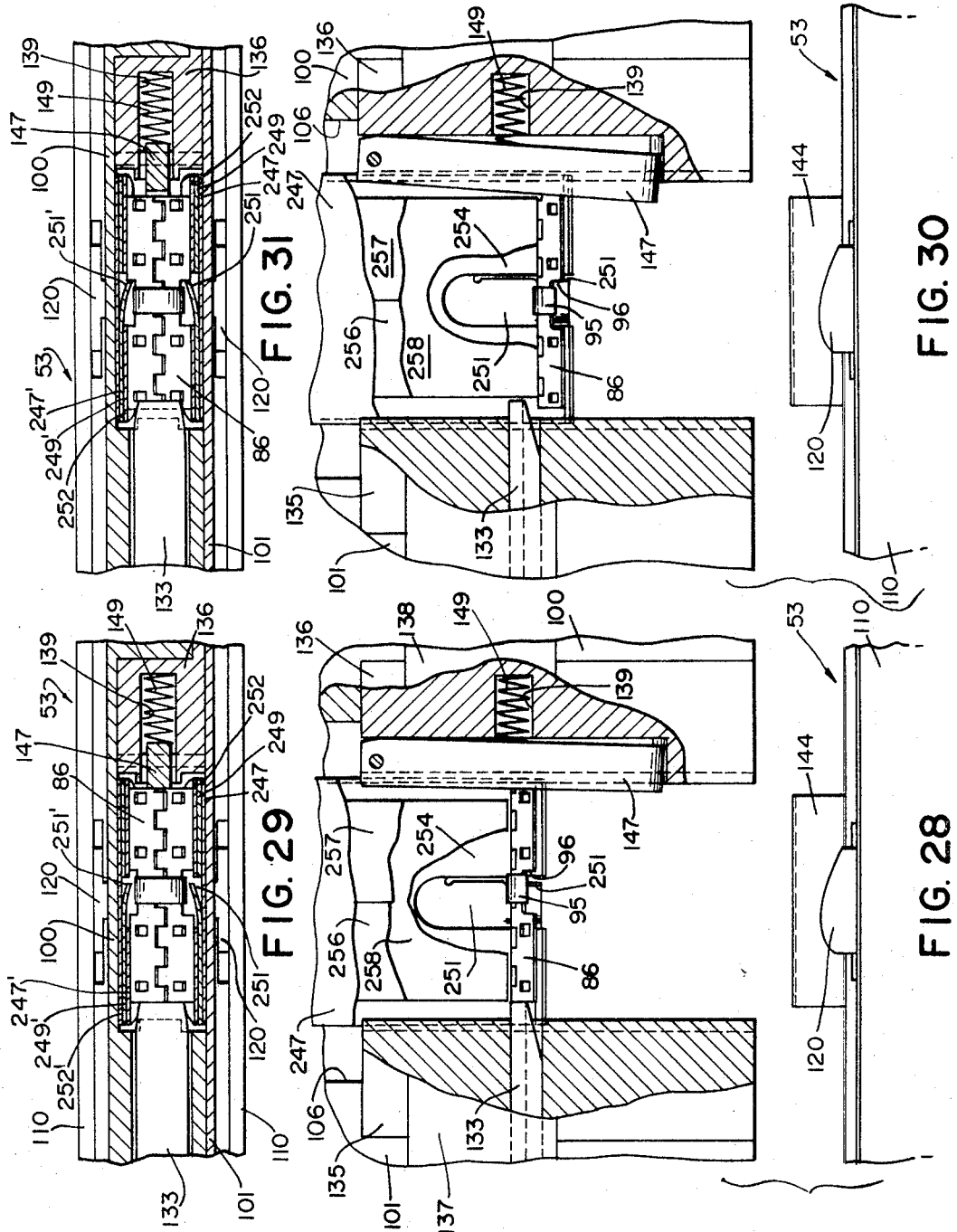

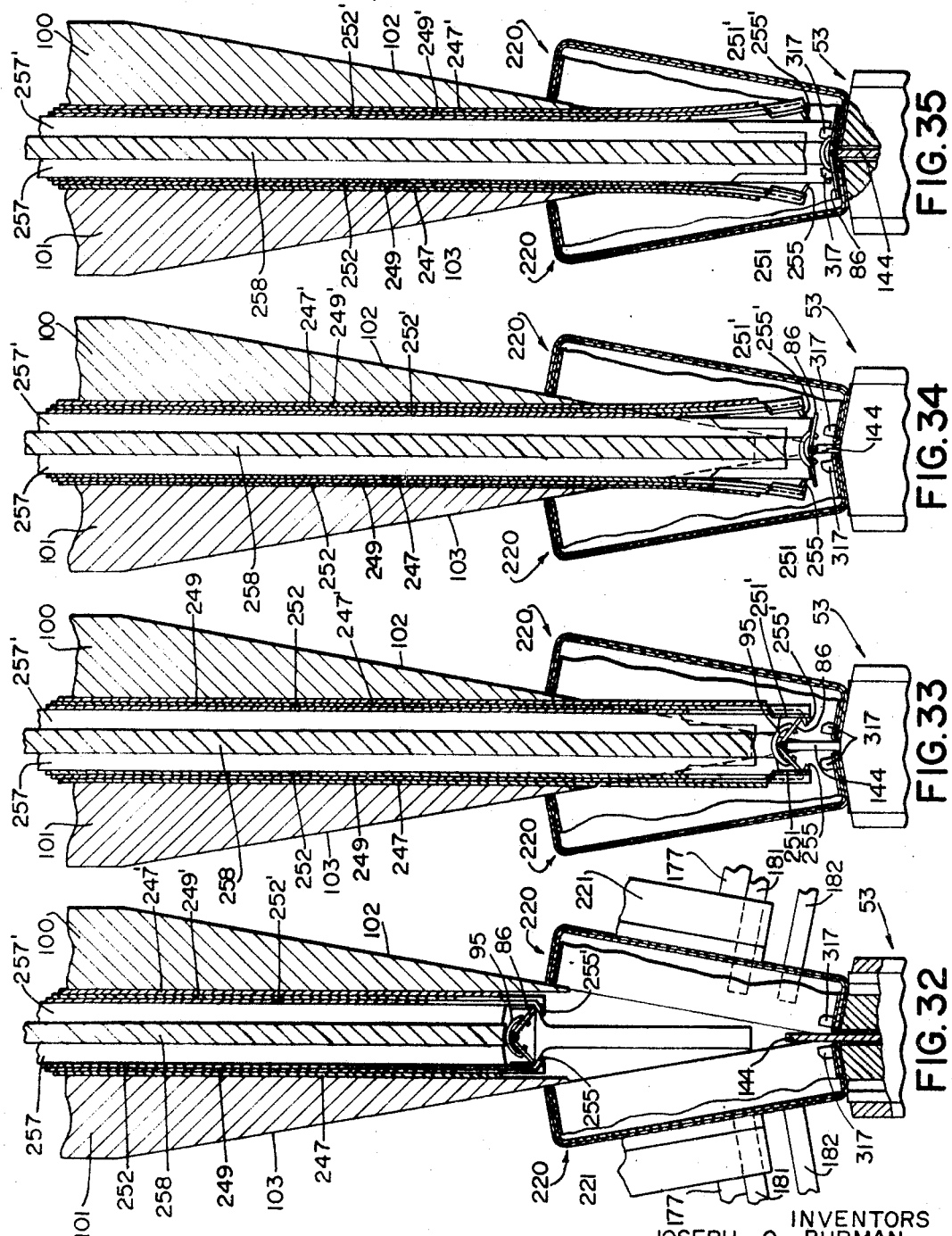

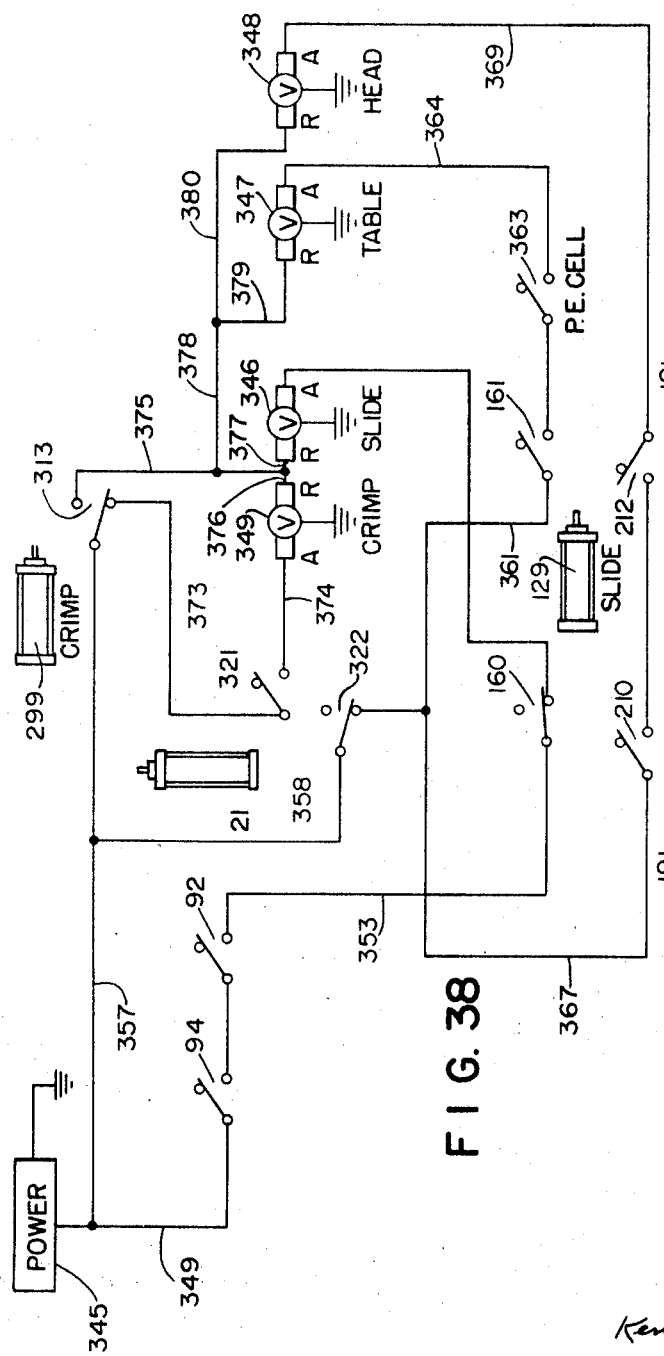
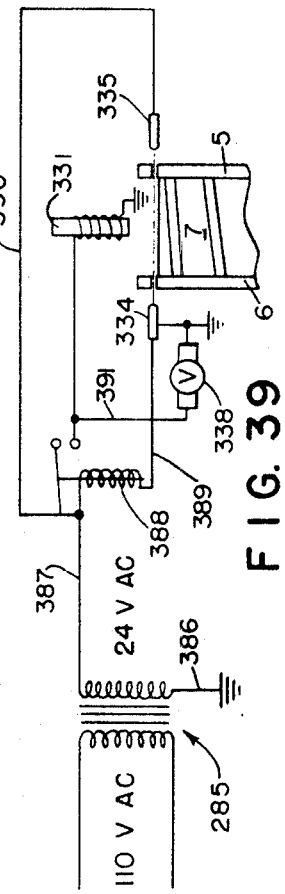

3,470,599
HINGE ATTACHING APPARATUS
Joseph O. Burman, Attleboro, and Louis L. Desrosiers, Taunton, Mass., assignors, by mesne assignments, to Eastern Case Parts Inc., Attleboro, Mass., a corporation of Massachusetts
Filed May 19, 1967, Ser. No. 639,701
Int. Cl. B29p 19/04
U.S. Cl. 29—208                              37 Claims

ABSTRACT OF THE DISCLOSURE

The invention is a machine or apparatus for attaching a hinge to a single box shell, or for attaching the hinge to a pair of box shells in order to hinge them together. The apparatus is an upright machine in which a box shell (or a pair thereof) is held on a guide on the machine at a vertical angle to the base of the machine, the wall of the shell which is to have the hinge attached thereto resting against a support. From a supply of hinges, an individual hinge is fed automatically to a position in which the hinge lies above the box shell, and then sequentially and automatically a vertically operating set of fingers grip the hinge and move it down on top of a box shell wall to rest over prongs on the wall of the box shell. Other automatically operating levers bend the prongs over the hinge leaf to attach the hinge to the wall of the box shell.

Background of invention

As indicated above, the field of the invention lies in the art of attaching hinges to boxes automatically. Particularly, it applies to this later identified field as the field concerns the making of jewelry boxes which generally are made of steel and which are fastened together by a bi-leaved snap-hinge using a C-spring. Since the hinges are to be attached to the box shells with the C-spring already on the hinge, the leaves of the hinges form an obtuse angle with each other. Thus, the box shells (if a pair are being hinged together) must be held at such an angle to each other that the walls of the shells to which the hinge is to be attached have the same angular relationship as the angle that the leaves of the hinges make to each other; or, if the shell halves are held with the walls at a predetermined angle, then during the hinging operation, that is, the operation of attaching the hinge to said walls, the hinge leaves must be rotated with respect to each other so that their angle is the same as that of the box shell walls.

The above description illustrates some of the difficulty in attaching hinges to boxes when it is realized that almost invariably for esthetic purposes, the hinge is on the inside of the box. In view of the angle made by the hinge leaves, this means that there is very little opening between the box shells in which one is able to operate in order to do the actual attaching. The attaching itself is done generally by striking prongs up from the box shell walls toward the interior of the shells. The hinge has holes provided therein which mate with these prongs. The hinge is placed down against the pronged-walls until the hinge comes to rest against the inside surface of the walls per se. At that point, the prongs are bent over in order to attach the hinge to said walls.

Because of the difficulties involved in this field, most hinging of such boxes is done by hand. This is time consuming, and in view of the fact that many millions of such boxes are made and used in the jewelry industry alone per year, it is obvious that any improvement in the operation of attaching such hinges (for example, by making the operation as nearly automatic as possible) will result in a large saving in labor with resulting savings in the cost of the boxes themselves. It is the general function of this invention to provide a machine which does such a hinging operation automatically once a box shell is placed on the machine to which a hinge is to be attached.

Summary of invention

The invention therefore broadly relates to apparatus for automatically fastening a hinge to a box shell or a pair of box shells, and among the several objects and advantages of the invention may be noted the following: the provision of apparatus for automatically attaching a hinge to a wall of a box shell; the provision of apparatus of the aforesaid class in which a hinge is taken from a continuous supply of hinges and automatically delivered to a position in which the hinge may be attached to the box shell; apparatus of the first named class in which means are provided for automatically ejecting a box shell with the hinge attached thereto from the apparatus prior to the application of a hinge to a second box shell; the provision of aligning means in the apparatus in order to position correctly a box shell or a pair thereof on the machine so that the shell is properly aligned with a hinge to be attached thereto; the provision of apparatus of the last named class in which means are provided for automatically positioning a hinge in a predetermined relationship to a locating point on the machine prior to attaching the hinge to the box shell; the provision of apparatus of any of the above classes which incorporates means for automatically conveying hinges from a source thereof to a first position from which the hinges are delivered consecutively to a second position from which they are moved to be attached to a box shell; the provision of apparatus of the last named class in which means are provided for preventing an improperly oriented hinge from reaching said first position; the provision of any of the machines of the aforesaid classes in which the motions of the several operating mechanisms and sub-assemblies are controlled by fluid-actuated pistons, interlocking means being provided to prevent improper sequencing of the various operating parts; the provision of apparatus of any of the foregoing classes in which magnetic means are used to assist the transfer of hinges from a source thereof to a position on the machine from which the hinges may be delivered to a hinge fastening position; the provision of apparatus of any of the foregoing classes in which means are provided for rotating the leaves of a hinge with respect to each other in order to have the angle between said leaves be the same as the angle between the walls of box shells to which the hinge is to be attached; and the provision of apparatus of the aforesaid classes which is economical to make, and simple and fool proof in its operation. Other objects will be in part apparent and in part pointed out hereinafter.

The invention accordingly comprises the elements and combinations of elements, features of construction, arrangements of parts, and manipulation of the apparatus all of which will be exemplified in the structures hereinafter set forth, and the scope of the application of which will be indicated in the appended claims.

Referring now to the accompanying drawings, in which is illustrated one of several possible embodiments of the invention:

FIG. 5 is a side elevation of a lower portion of the FIG. 1 embodiment, also enlarged to show certain detail in greater clarity, certain portions thereof being in cross-section;

FIG. 5(a) is an enlarged section of a portion of the FIG. 4 view taken in the direction of sight lines 4a—4a on FIG. 4;

FIG. 7 is a front elevation of a conveying cylinder or drum used on the apparatus, certain parts of the apparatus having been removed in order to expose details of the drum;

FIG. 8 is a side elevation corresponding to the FIG. 7 view;

FIG. 9 is an illustration of a portion of a bottom guide member, showing certain levers used in the apparatus for the purpose of actuating a photocell mechanism;

FIG. 18 is an enlarged side elevation of the upper portion of the aforesaid head, given to show certain constructional details in greater clarity;

FIG. 19 is a plan view corresponding to the FIG. 18 view, partly in section;

FIG. 20 is a view similar to FIG. 18, showing the operating parts of the head in a second position;

FIG. 22 is a bottom plan view of the FIG. 21 table;

FIG. 23 is a side elevation of the FIG. 21 table;

FIG. 28 is an operational view showing the hinge in the head guide, preparatory to delivery to a third position;

FIG. 29 is a sectional plan view of FIG. 28;

FIG. 30 is a view showing an intermediate position of the hinge in the aforesaid head, showing certain details of a mechanism for longitudinal position adjustment;

FIG. 31 is a sectional plan view of FIG. 30;

FIG. 32 is a front sectional elevation of the operating head corresponding to FIG. 28, with a supporting anvil having moved up into a predetermined position;

FIG. 33 is a second position showing the hinge gripped between the anvil and the bearing plate of the head;

FIG. 34 is a third position showing the hinge having escaped from the grippers of the head immediately prior to moving onto the prongs of the box-shells;

FIG. 35 is a view showing the hinge in position of the prongs, and preparatory to having the prongs crimped over the hinge to fasten it to the box-shells;

FIG. 38 is a wiring diagram showing the electrical connections for the several switches and solenoid valves that control the operation of the fluid operated pistons of the machine; and FIG. 39 is a wiring diagram for means on the machine for picking off hinges which are not properly deposited in the grooves in the conveying drum.

Figure 1:
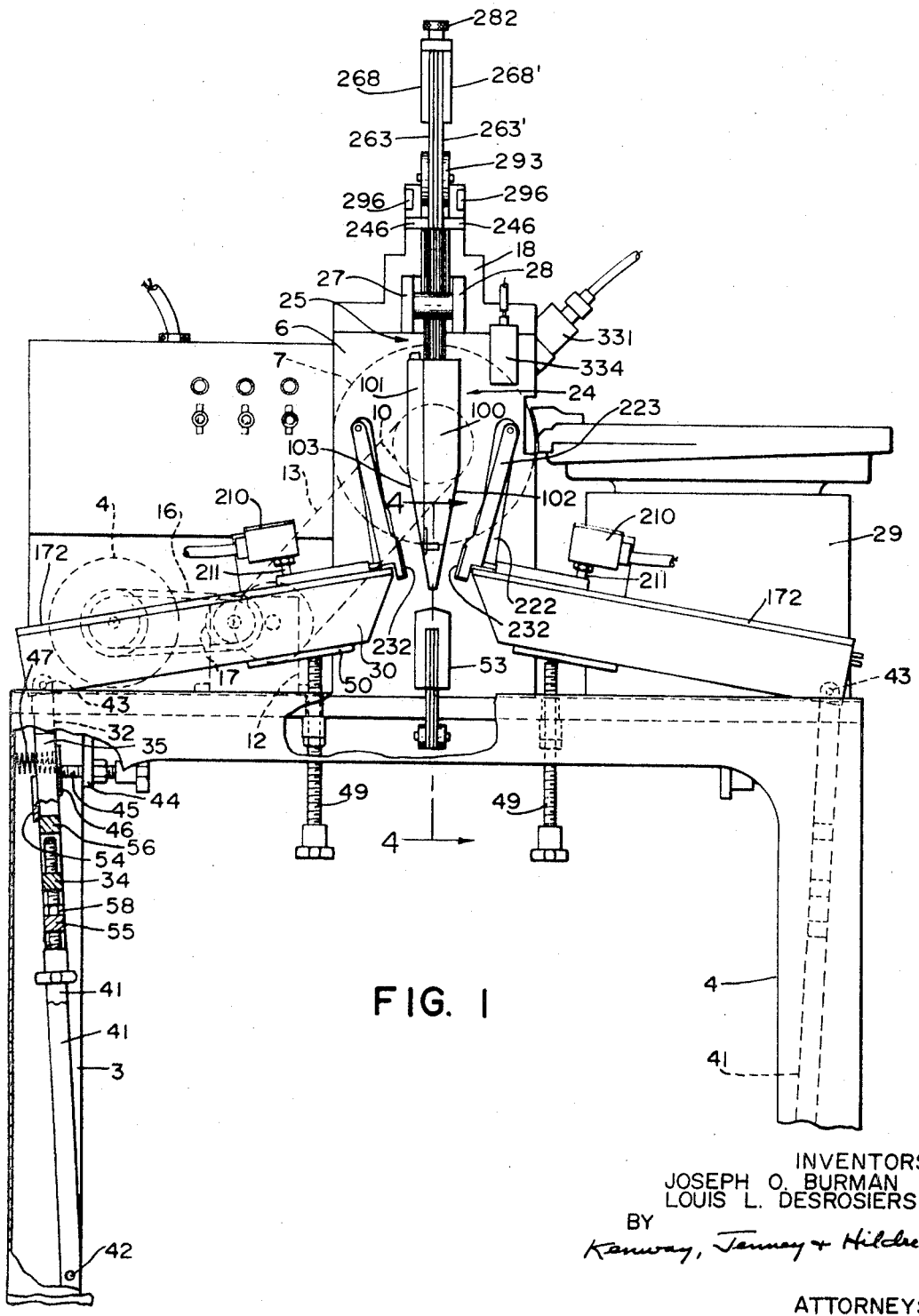
FIG. 1 is a front elevation of the embodiment of this invention.

Similar reference characters indicate corresponding parts throughout the several views of the drawings, and in the drawings dimensions of certain of the parts may have been modified and/or exaggerated for the purposes of clarity of illustration and understanding of the invention. For the same reason, in certain of the views, parts have been omitted in order to reveal more clearly other parts which otherwise would have been concealed, thus making the drawings confusing.

In the following description of the embodiment of this invention, the description will be organized in ten sections as follows:

I—General description
II—Conveying means for moving hinge to first position
III—Box-shell positioning means, and hinge transfer means (first to second position)
IV—First positioning means for moving hinge from second to third position
V—Actuating means for first positioning means and wiping means
VI—Pick-off means for misplaced hinge
VII—Control and wiring diagram
VIII—Operation The above order of description will be followed as closely as possible and in the description, the cooperation between and interrelations between the various sub-assemblies given above will be clearly identified. Except when otherwise specifically mentioned in the description, all parts and members of the apparatus are made of metal conventionally most suitable for the intended purpose in accordance with good machine design practices.

I.—General description

Figure 2:
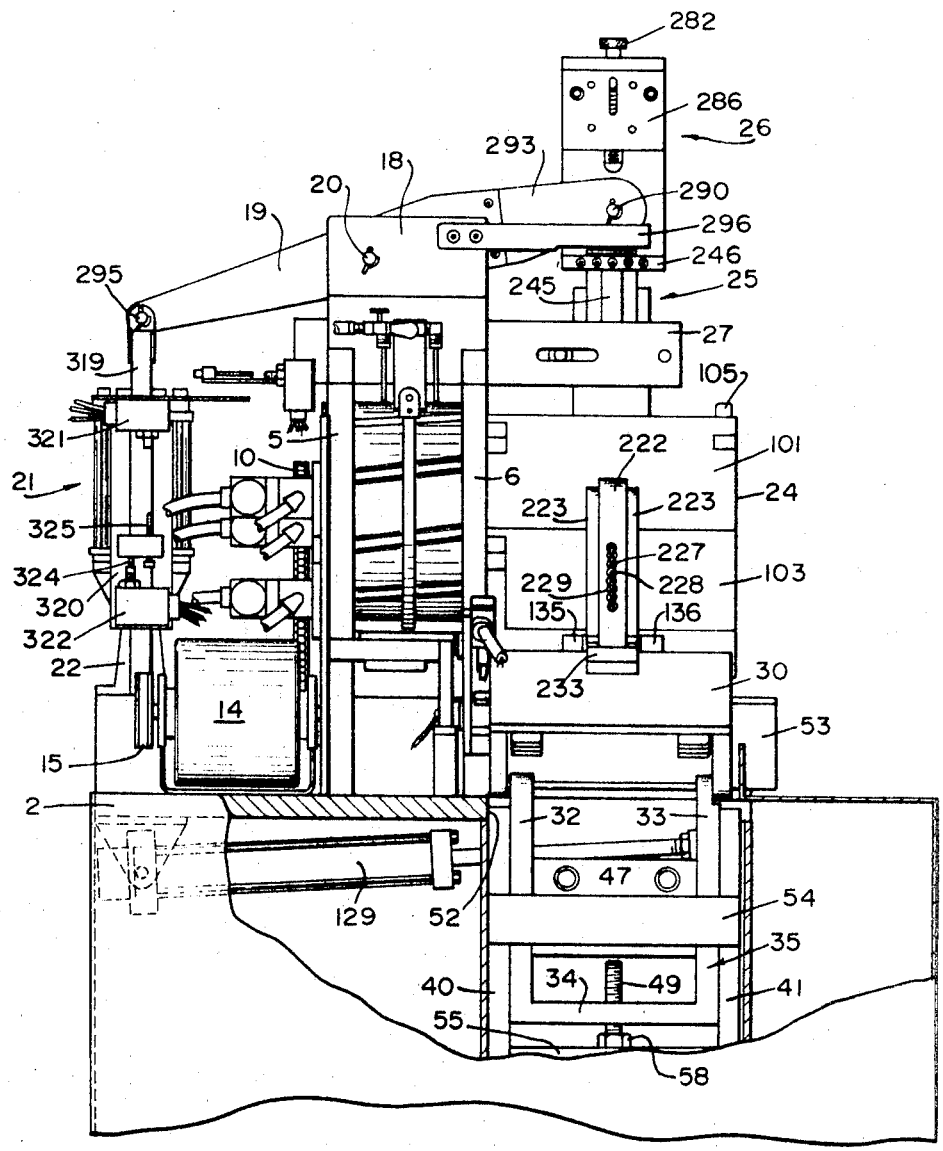
FIG. 2 is a side elevation of the FIG. 1 embodiment.

Referring first to FIGS. 1 and 2, a front elevation and side elevation of the apparatus of this invention are shown. A base 2 is provided supported, for example, on the legs 3 and 4. (As illustrated in FIG. 1, numeral 3 represents the back legs of the machine and numeral 4 represents the front legs of the machine, and the construction of the supporting legs is entirely conventional.) Fixed on the base are two upright parallel standards 5 and 6 which support between them a rotating drum or cylinder 7, the cylinder being supported on a conventional bearing 8 (see FIG. 8) and conventionally fastened to the shaft 8 by means of a standard key construction 9. A sprocket wheel 10 is fastened to shaft 8, and is aligned with a sprocket wheel 11 (see FIG. 3) which is the output of the gear reduction unit 12 also mounted on the base 2. A sprocket chain 15 is trained on sprocket wheels 10 and 11. A conventional electric motor 14 is also mounted on the base on a suitable standard, and its shaft drives the V-belt pulley 15, the latter in turn driving the belt 16 which drives the input pulley 17 of the gear reduction unit 12.

Figure 3:
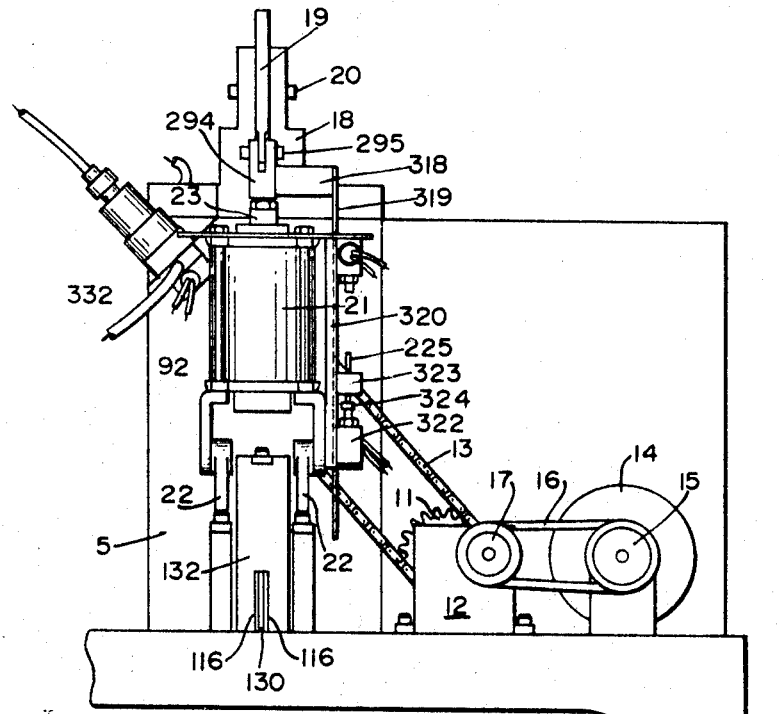
FIG. 3 is a rear elevation of the apparatus.
Figure 3A:
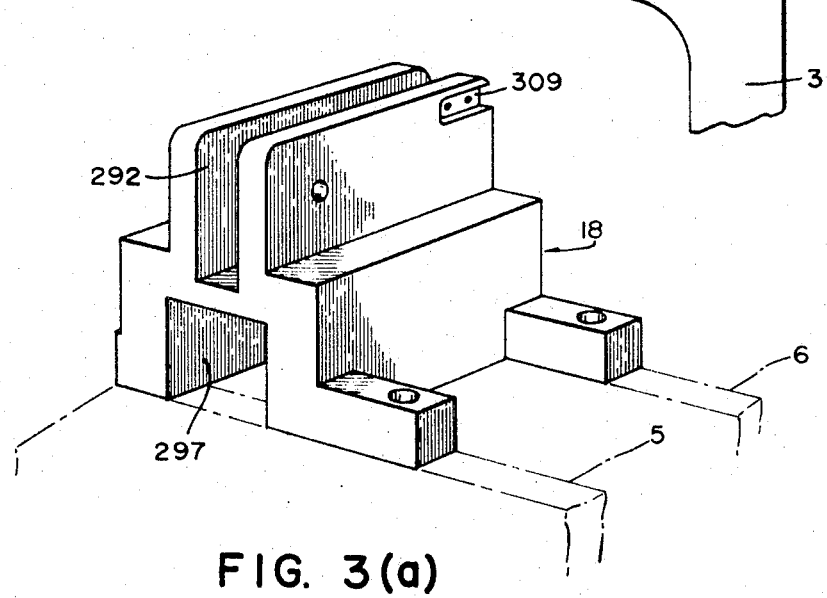
FIG. 3(a) is an illustration of a guide member used on the apparatus.

The tops of the standards 5 and 6 are joined by a shaped guide member 18 (see FIG. 3(a)), the latter serving as a support for a simple lever 19 which is pivoted on the guide 18 by means of pin 20.

At the rear of the machine is mounted a fluid operated piston indicated generally by numeral 21, this being mounted uprightly on the base 2 by means of pivot bearings indicated generally by numeral 22 (see FIGS. 3(a) and 5), the piston 23 of the cylinder 21 being fastened to one end of the lever 19 by a conventional clevis 294.

Fastened to the standard 6 and projecting forwardly of the machine is a head guide member 24 the construction of which will be given in detail below, this member serving to align a box shell or a pair of box shells in proper position on the machine, and also to guide the motions of the compound system of slidable fingers, levers and plates slidably mounted within member 24 and which are called herein collectively the first positioning means and indicated generally by numeral 25. The other end 293 of lever 19 is pivotally fastened to a head member indicated generally by numeral 26.

In order to actuate certain fingers of the first positioning means 25, these fingers must be squeezed together. In order to do this, a pair of sliding arms 27 and 28 are provided, these arms sliding in the channel 35 provided in the guide 18. Further description of these squeezing arms and how they operate in conjunction with another slidable member will be given below also.

Mounted on the base 2 is a container 29 for a supply of hinges, this container preferably being one that will feed hinges by agitation onto the cylinder 7. For example, a container such as one going by the trade name Syntron may be used. The container 29 is conventional. The outlet of the container 29 is adjacent the cylinder 7 as will be described below.

Also mounted on the base 2 are a pair of locating tables 30 and 31, these tables being similar in their construction which will be given below. Each of these tables is mounted by pivots on a pair of legs 32 and 33 which form, together with cross-bar 34 a U-shaped frame 35. The frame 35 slides in the longitudinally extending pair of side-supporting legs 40 and 41, each pair of which are pivoted near the bottoms of the sides of the apparatus, as shown, by means of the pivots 42. The upper extremities of the legs 32 and 33 are pivoted by means of the pivot rod 43 to the side walls of the tables 30 and 31, as indicated in FIGS. 1 and 2. Legs 40 and 41 are maintained in their parallel relationship by cross-member 54 and the cross-bar 55. The frame 35 is braced by a cross-bar 56.

In order to flexibly support the upper end of the supporting legs 40 and 41 in a lateral direction a cross bar 44 is mounted across the legs 3 and 4 at each side of the base, and threaded through the cross-bar 44 is an adjusting screw 45, the end of which bears against a plate 46 which is fastened to the bracket 35. A pair of springs of relatively heavy gauge wire (and thus fairly stiff) have at one end of each seated in the cross bar 46, and the other ends rest against the enclosing side 48 of the machine base. Thus, by turning the adjusting screw 45, the lateral position of the supporting legs 40 and 41 is adjusted about the pivot 42 in order to move the tables 30–31 closer to or further away from the head 24.

The frames 35 (and thus the elevation of the outer ends of the tables) are made adjustable within the enclosing legs 41–42 and cross bars 46 and 54, by threading the adjusting screw 57 through cross-bar 55. The upper end of the screw is a sliding fit in a hole in cross-bar 34 and passes therethrough to engage the cross-bar 56 of frame 35. A locknut 58 may be used to lock the screw in an adjusted position.

Since each of the tables 30–31 is pivoted about the pivot points 43, adjustable means are provided at the inner ends of the table to support them vertically, this means comprising a pair of adjusting screws 49 which are threaded into the base 2, and the upper ends of which support bottom plates 50 and 51 of the tables 30–31 respectively.

It will be noted that the table 2 is provided with the opening 52 therein so that the upper ends of the supporting legs of brackets 35 may protrude above the level of the base in order to support tables 30–31.

Extending longitudinally across the machine is what is called a slide guide 53 which will be described in greater detail below. The guide 53 overlies the table 2 as shown in FIGS. 1 and 2, and extends through the standards 5 and 6 at the bottom thereof in slots suitably provided therein. Guide 53 terminates at the standard 5, and is held in position conventionally by machine screws which may be provided to run upwardly through the base and into the bottom of the slide guide, or more preferably, the screws may be inserted laterally through standards 5 and 6 and threaded into the side plates of the slide guide 53. As indicated, the slide guide lies directly below the guide member 24.

II.—Conveying means for moving hinge to first position

As has been indicated above, a conveying means is provided which takes hinges from a supply thereof and one by one conveys them to a first position, from which hinges will be singly delivered to a position in which they may be manipulated to be placed on the prongs or tabs of a box shell for attachment thereto.

In the particular embodiment shown and described herein, the conveying means for moving the hinges successively from the source thereof to the predetermined position includes a rotating drum or cylinder 7. Reference to FIGS. 7 and 8 will indicate clearly the construction of the drum, and as is common in order to reduce weight, the drum is made as a cylindrical shell having a center hub portion 60 which is bored to receive as a sliding fit the drive shaft 8, drive shaft 8 being keyed to the hub 60 by a conventional key and key-way 9.

The outer periphery of the drum is provided with a series of peripherally spaced grooves 62, the function of which is to receive hinges individually from the source 29 thereof. It will be noted that each of the depressions 62 is angled at a skew angle to the shaft 8 of the drum for a purpose which will be described below. A reference to FIGS. 25–27 will illustrate how the hinges lie in each depression, and it will be noticed that the leaves of the hinge naturally are circumscribed by the semi-circular shape of the depressions.

Beneath each depression and in the peripheral skirt 63 of the drum, there is drilled a hole from one face of the drum to the other. At one side, the hole is larger in diameter than the other as illustrated at numerals 64 and 65. Within each of the holes 64–65 is inserted a permanent magnet 66 the function of which is to retain a hinge in its particular depression as the hinge is carried around by rotation of the drum about its axis to the position shown in FIG. 26, for example, the hinges being made of magnetic material such as steel. Depending on proper operation of other elements of the machine such as what will be illustrated below as the hinge receiver, the hinge is retained in its particular depression by means of the permanent magnet 66, or is pulled out therefrom by means of stronger magnets in the hinge receiver. This will be described below.

A guide member 67 surrounds one-half of the periphery of the drum 7 and its function is two-fold: One function is to help hold the hinges in their respective grooves as the drum rotates, and the other function is to support the hinge receiving box 68. That is, the guide 67 prevents any accidental displacement of the hinge in its depression as the drum is rotating, and also serves to locate the hinge receiving box 68 below the bottom of the drum as shown in FIGS. 7 and 8. On the other side of the drum there is mounted a second guide member 69, this member being supported in the position shown in FIG. 6 by means of a cross-rod 70 which extends between the standards 5 and 6. The hinge receiver 68 is fastened to the end of guide 67 by means of the machine screw 71. The other end of the guide 67 is received in a supporting plate 72 which is fastened to the guide member 18 as shown, and the end of the guide is provided with a rabbet 73, being latched therein by rotatable latch bar 74.

The bottom end of the hinge guard 69 is provided with a clevis 75, the arms of which straddle the corner 76 of the hinge receiving box 68. When the hinge receiving box 68 is in place, its bottom surface rests against the two support plates 77 which are fastened to the interfaces of the standards 5 and 6 at the correct level.

A hinge receiving support plate 80 (see FIGS. 6, 7 and 8) is pivoted at one end to the base 2 (the pivoting means not being shown since it is conventional), and is located as shown between the standards 5 and 6 and below the drum 7. The plate 80 carries thereon a hinge receiver bracket arm 81 which is attached to the arm 80 by means of a machine screw 82, the bracket arm being provided with a slot 83 (see FIG. 6) by means of which it may be fixed adjustably on the arm 80. At the other forward end of the bracket arm 81 there is carried by conventional means a hinge receiver block 83, the function of which is to pull a hinge from an adjacent groove 62, then move the hinge downwardly as the drum continues to rotate. A further function of the hinge receiver block, as illustrated in FIGS. 25–27 is effectively to cause a hinge to skew out of its groove, and by such skewing cause the hinge always to leave its depression properly (without turning over) and come to rest on the block 83.

Figure 25:
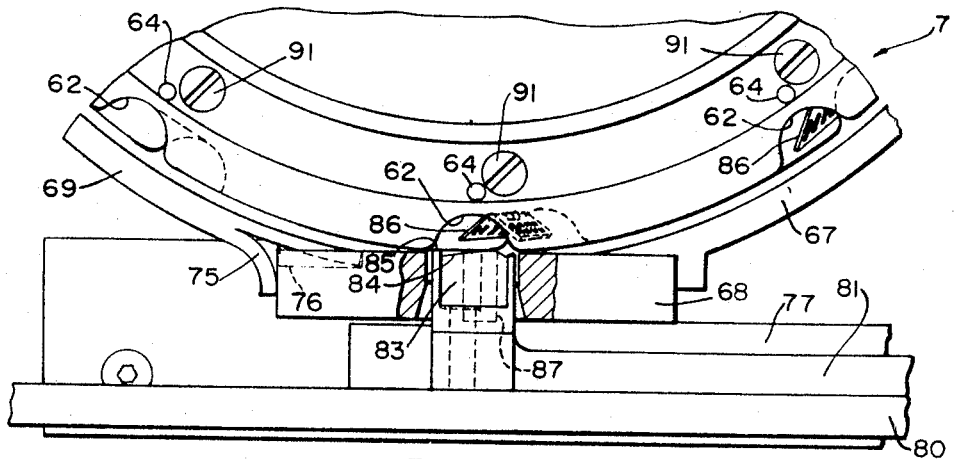
FIG. 25 is a view of a portion of the operating or conveying drum of the device, showing a hinge in position preparatory for removal from the drum by a hinge receiver.
Figure 26:
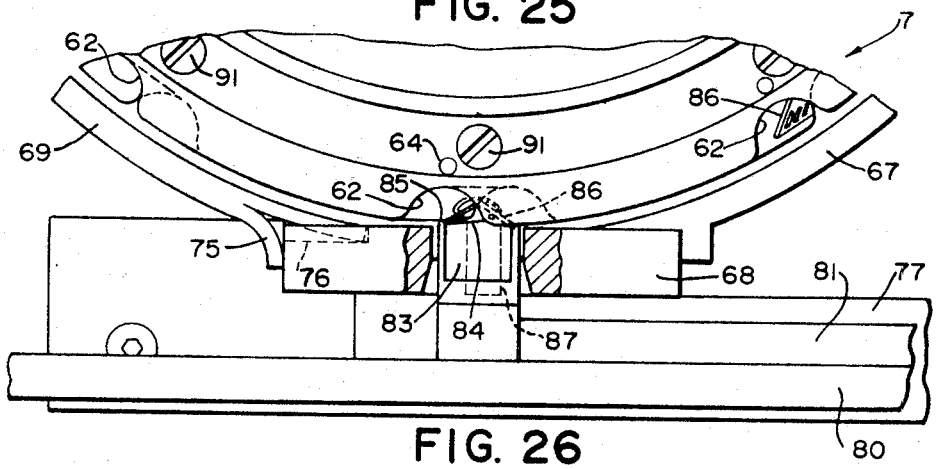
FIG. 26 is a view similar to FIG. 25 but showing a further movement of the conveying drum with the hinge on the hinge receiver.
Figure 27:
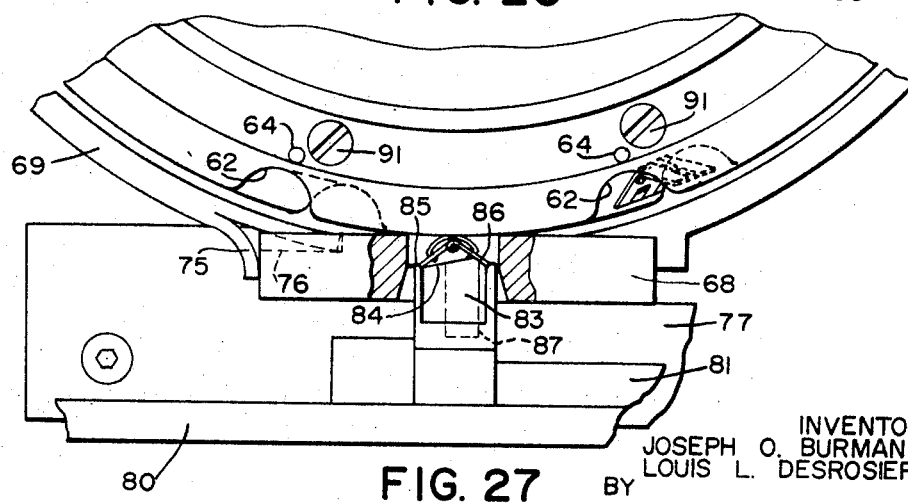
FIG. 27 is an operational view similar to FIGS. 25 and 26, but showing a still further motion of the conveying drum, and with the hinge and hinge receiver in position to release the hinge for transfer into the aforesaid head.

Referring to FIGS. 25–27, the support plate 80, the hinge receiver bracket arm 81, the hinge receiving box 68, and the hinge receiver block 83 are shown in position beneath the drum 7. In these three successive views, it is assumed that the drum is rotating in a clockwise direction. It will be observed that the hinge receiving block 83 is provided with a wedge-shaped upper surface 84, the outer edges of this surface terminating inwardly of the sides of the block so as to leave the upwardly projecting longitudinal shoulders 85. The length of hinge receiver 83 is parallel with the axis of the drum 7, and thus it is apparent that as a given groove 62 approaches the hinge receiver, one end of the groove approaches the hinge receiver first. The result of this is that one end of the hinge is started in its sliding skew motion out of the groove instead of the entire longitudinal edge of the hinge being acted upon. By this means, the hinge is prevented from "rolling" in the groove as it emerges therefrom, and the hinge becomes properly aligned and in place on the hinge receiver 83. That is, if the grooves were parallel to the axis of the drum, then when a groove were to approach the receiver 83, all points along an entire edge of the hinge would strike a shoulder 85 of the hinge receiver simultaneously. This would have a strong effect (and in practice was found so to have) of causing the hinge to roll within the groove, instead of sliding out of it. For the proper operation of the machine, it is necessary that the hinges be properly aligned in the hinge receiver block 83 as shown in FIGS. 25–27, so that the hinge may properly be transferred to a second position where it will be properly oriented for fastening to a box shell. Furthermore, since this part of the apparatus is well within the interior of the machine itself, a hinge which would have thus become "rolled" would be difficult, if not impossible, to remove from the machine without disassembling the latter.

In order to enable the hinge receiver 83 to take a hinge from a groove 62 by overcoming the magnetic pull of the magnets 66 behind the grooves, a pair of magnets 87 are mounted in the hinge receiver by conventional means, such as by drilling suitable holes in the receiver and inserting the magnets therein. It is to be noted that the magnets 87 are stronger insofar as their magnetic fields are concerned, than any of the magnets 66, with the result that when a groove 62 brings its hinge over the hinge receiver 83, the magnets 87 exercise a pull on the hinge to overcome the pull of magnet 66, thus greatly assisting in the removal of the hinge from its given groove and aligning it on receiver 83.

It is also to be noted that the drum or cylinder 7 is rotating continuously as this action takes place, and therefore as the hinge leaves the groove, it pushes down on the hinge receiver 83, which in turn pushes down on the pivot plate 80. (This is clearly shown in FIG. 27). Referring again to FIGS. 7 and 8, a switch actuating screw 88 is threaded into the end of the plate 80 and locked therein by conventional means such as a lock nut (as shown). Below the end of the screw 88 and on a bracket 89 which is mounted on base 2 by conventional means, there is mounted a snap switch 94 the operating plunger 90 of which is located under the end of screw 88. By properly adjusting the screw 88, when the plate 80 is depressed by the action of the hinge coming out of its respective groove, the actuating screw 88 will actuate the plunger 90 to throw switch 94. The effect of actuating switch 94 will be described below in the description of the wiring diagram.

Also screwed into the peripheral face of the skirt 63 of drum 7 are a series of machine screws 91 with their heads projecting, and it will be noted that one of these screws is provided for each of the grooves 62. The heads of these screws serve to actuate a snap acting switch 92, the switch 92 being so mounted on the standard 5 that the switch plunger 93 with its roller projects far enough in towards the face of the skirt 63 that when a head of a screw 91 comes to the end of the plunger 93, the plunger will be actuated and the switch contacts operated. The effect of operation of switch 92 will be described below in connection with the wiring and control diagram. It can be stated here, however, that at the time that switch 92 is operated, the drum has moved far enough around that the hinge is in the approximate position shown in FIG. 7, that is, about half-way between two adjacent grooves.

It is also to be noted that since the use of magnets of different strengths is utilized in order to assist in obtaining proper removal of a hinge from its groove and its orientation in place on its hinge receiver 83, the hinge receiving box 68 is made of stainless steel, as is also the hinge receiver 83. It is well known that stainless steel does not have the magnetic properties of ordinary iron or steel, and thus the full effect of the magnets 87 may be used to attract the hinge 86 out of its pertinent depression.

With a hinge on the hinge receiver 83 as shown in FIG. 23, the next operation consists of transferring the hinge 86 from the receiver 83 to a second position, the latter being located within the guide 24. Accordingly, this guide will now be described.

III.—Box-shell positioning means, and hinge transfer means (first to second position)

Figures 13, 14:
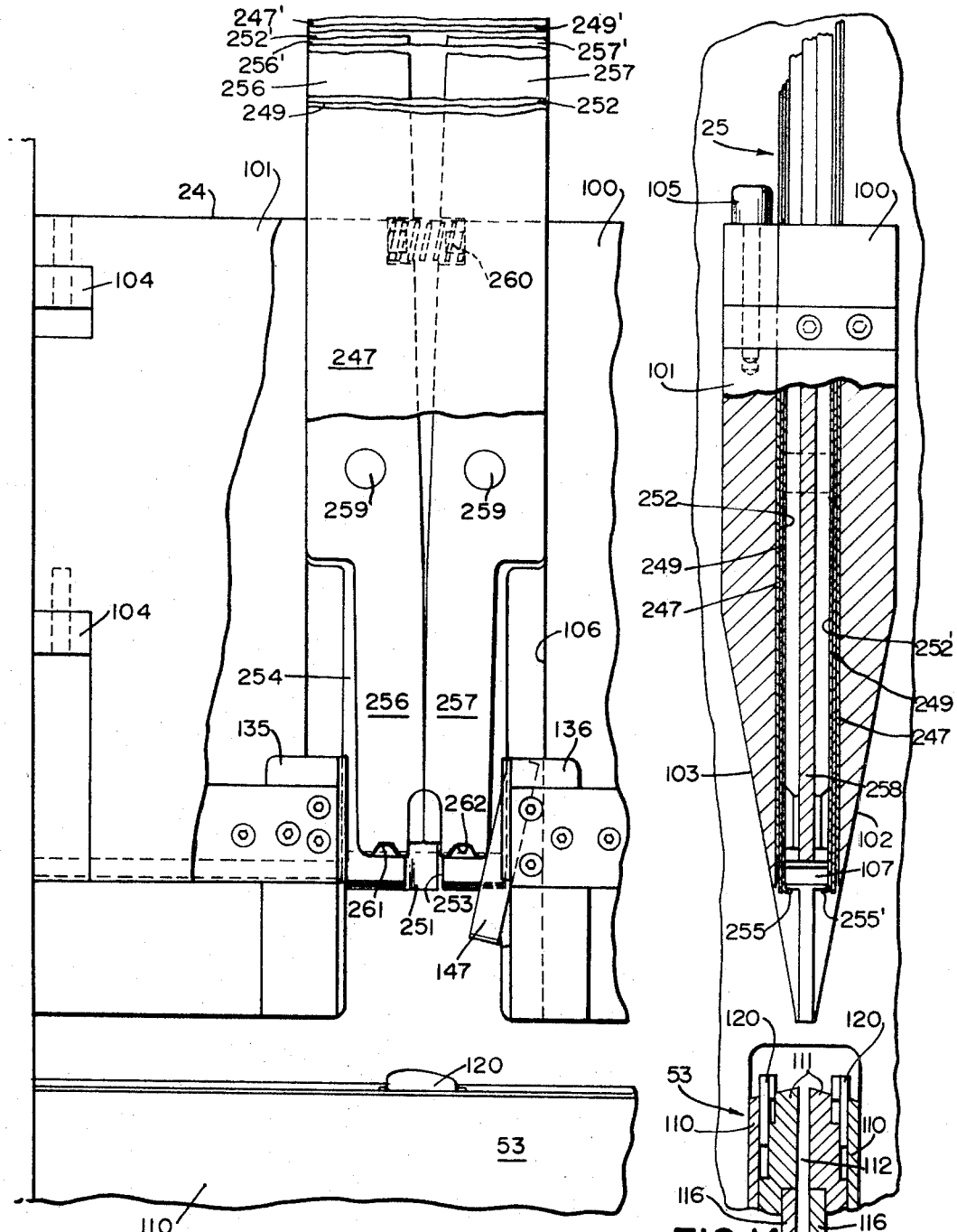
FIG. 13 is a side elevation of a lower portion of the aforesaid head with certain parts broken away in order to expose for greater understanding certain operating and constructional features thereof.
FIG. 14 is a front sectional elevation corresponding to the FIG. 13 view.
Figure 15:
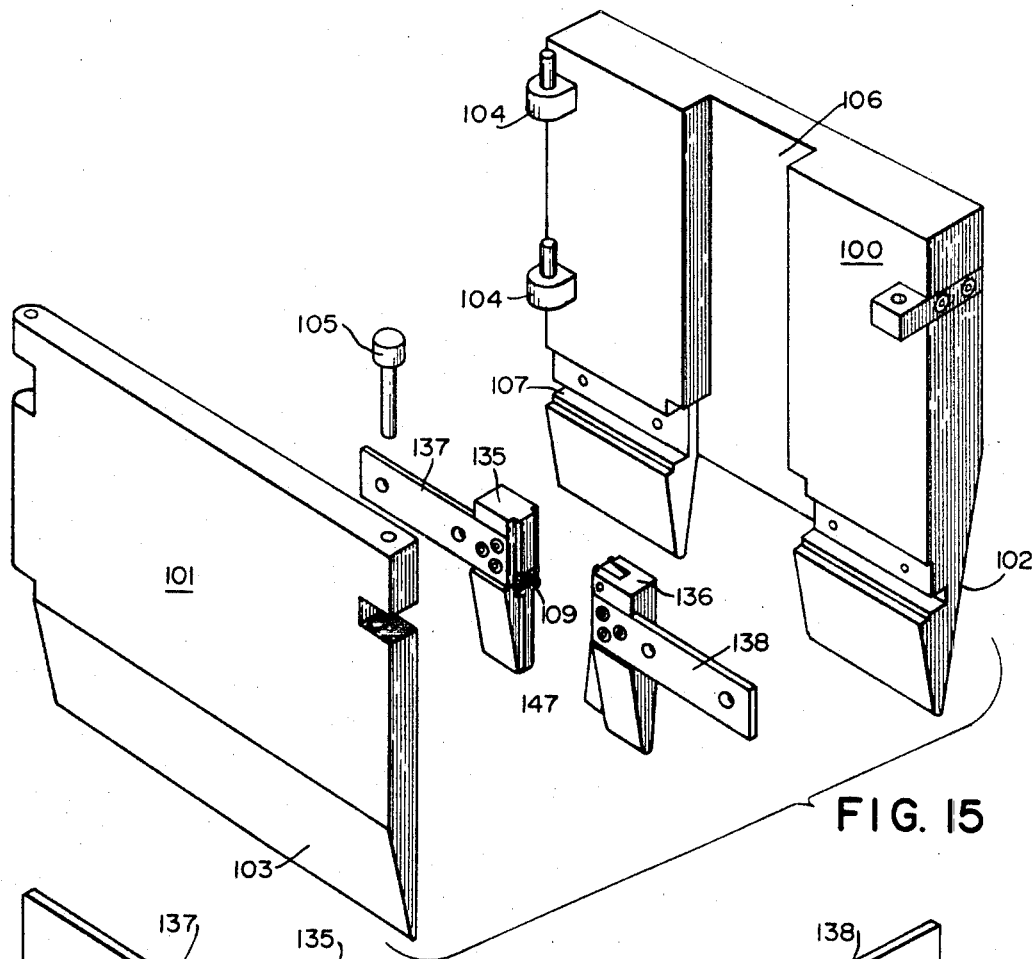
FIG. 15 is an exploded view of the head guide portion of FIG. 13.
Figure 16:
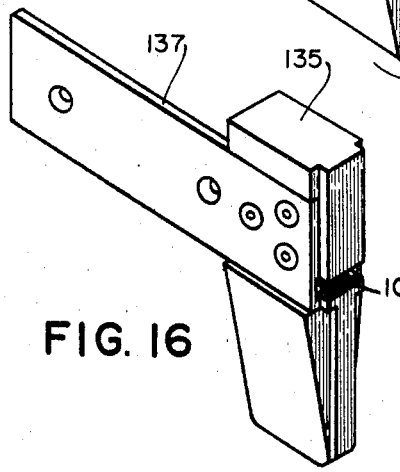
FIG. 16 is an illustration of an element of FIG. 15.
Figure 17:
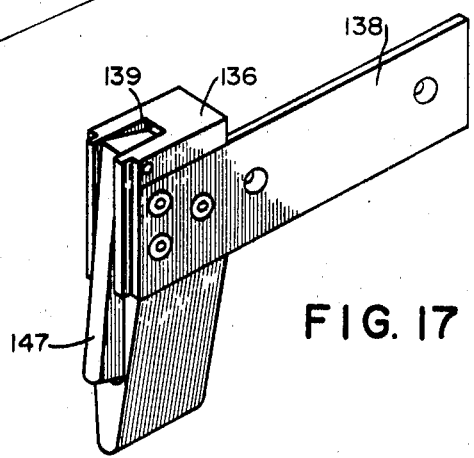
FIG. 17 is an illustration of another element of FIG. 15.

Referring to FIGS. 1, 14 and 15, the head guide member 24 consists of the stationary plate 100 and a cover 101 therefor. Each of the stationary plate 100 and cover 101 has its lower end tapered, as shown by numerals 102 and 103 respectively, at a predetermined angle to the base 2. The cover 101 is hinged to the stationary plate 100 by means of the pintle hinges 104 as indicated. A latch pin 105 serves to lock the cover plate against the plate 100 when the machine is being operated.

The inner surface of the stationary head plate 100 is provided with a channel 106, the purpose of which is to hold and guide the group of operating fingers and crimping levers 25 which will be described below. A longitudinal groove 107 is cut into the inner surface of the plate 100, terminating at one end in the channel 106, and at the other end being contiguous with a hole 108 in the standard 6 (see FIG. 5) having a similar cross-sectional shape.

Groove 107 and hole 108 are so positioned above the base 2 that they lie in line with the top of the hinge receiver 83 when the latter has been moved downwardly by the emergence of a hinge from the respective drum groove as illustrated in FIG. 27. It is along the grooves 107 that a hinge is to be moved from its first position on the hinge receiver to its second position within the plate 101. Thus, the "height" of groove 107 is the same as the height of the hinge in the position shown in FIG. 27, and the depth of the grooves 107 is equal to the width of the hinge. Of course, in saying that this height and depth are equal to the height of the hinge and the width of the hinge, sufficient tolerance is permitted in the making of the groove to permit the hinge to slide freely along the grooves.

A pair of inner guide pieces 135 and 136 are provided (see FIGS. 13 and 15–17) to which are fastened the brackets 137 and 138. Brackets 137 and 138 are fastened (see FIG. 13) to plate 100 in suitably provided shallow but closely fitting rabbets to hold the guide pieces 135 and 136 firmly in place against the side walls of channel 106 as shown in FIG. 13. Piece 135 is provided with a hole 109 aligned with groove 107 and of like cross-sectional shape. Pivotally inserted in a dado 139 in guide piece 136 is a lever 147 pivoted by pivot 148, and resiliently biased outwardly by compression spring 149 (see FIG. 13). When assembled in head 24, the distance between the opposed facing surfaces of inserts 135 and 136 is just slightly larger than the hinge being used, (that is, about $\frac{1}{16}$ inch).

A second portion of the guide means for the box shells is the combined support and transfer-slide guiding means 53. Referring to FIGS. 5 and 5(a), the guide means is a composite structure including a pair of outer cover plates 110, and a pair of inner guide plates 111, each of these guide plates being provided with elongated slots 112 whose function will be described below. (In FIG. 5, the nearest cover plate has been removed completely, and portions of other members are broken away to expose inner elements.) As has been indicated above, the assembly of the plates 110–111 is held together in the standard 6 preferably by screws passing laterally through the standards and into the plates 110 and 111 on each side of the guide member, the support plates 111 being spaced suitably apart at the forward end by a conventional spacer 114 so as to provide a slot 112 (see FIG. 5(a)) between plates 111; and at the rear end of the attachment of the plates 110–111 to each side of the properly provided opening in the standards 5 and 6 as set forth above, holds the rear end of the guide plates apart to maintain said slot for the whole length of the guide plates.

The adjacent surfaces of the plates 111 are provided with rabbets 115 in order to receive slidably the slide plates 116. The outer surfaces of the plates 111 are provided with rabbets 117 (see FIG. 8) in order to receive the levers 118. Levers 118 are pivoted on the respective adjacent plates 111 by means of the pivots 119. The forward end of each of these levers ends in an extension 120 which in one position of the lever projects above the top surface of the guide 53. When the projections 120 thus extend, the rear ends of the levers are in a downward position as shown in FIG. 8. Said rear ends are provided with the upward extensions 121, and as shown in FIG. 8, the upward extensions 121 mask or close off suitably provided axially-aligned holes which traverse the plates 110 and the plates 111. However, if the forward ends 120 of each of the levers 118 is depressed, as by placing box shells so that their sides or ends rest against the top surface of the slide 53, then the rear ends 121 of the levers are raised, and holes 122 are provided in these rear ends which will become aligned with the holes through the plates 110 and 111 so as to permit the passage of light therethrough. Thus, by this construction, if box shells are placed on the guide properly it will depress the levers 118, thus raising the rear ends of the levers and permitting light to shine through a continuous hole through the levers and plates.

Mounted on suitable brackets on the inner side of the standard 6, is a photoelectric cell indicated generally by numeral 123 (see FIG. 6), this being on one side of the guide 53. On the other side of guide 53 is mounted a light source indicated generally by numeral 124. The photoelectric cell and light source are positioned in alignment with the holes provided through the plates 110 and 111, with the result that when the forward end of the levers 118 are depressed as by the positioning of box shells on the top surface of the guide 53, the holes 122 are raised to be in alignment as aforesaid, and light will reach the photoelectric cell 123 from the light source 124. If there are no box shells resting on the slide guide properly, then the extensions 121 at the ends of levers 118 will block off the light from light supply or light source 124, and thus the photocell 123 will not be activated.

Slide plates 116 terminate at their forward ends in the downwardly extending arms 126, the ends of the latter being received in a clevis 127 at the end of a piston rod 128. Piston rod 128 is actuated by the fluid-operated (preferably air) cylinder 129 which is pivotally supported from the underside of base 2 by means of support brackets 129.

The rear (left as viewed in FIG. 5) ends of plates 116 are separated by spacer 130 and are held together within a suitably provided clevis in the upwardly extending arm 132. The forward ends of plates 116 are separated by a suitable spacer these spacers being dimensioned as to form a space between arms 116 the width of space 112. As additional guide strip or spacer 135 is provided at the lower end of standard 5 and passing between the plates 116. The inner surfaces of the plates 111 and the guide strip 135 cooperate to guide the plates 116 smoothly along the length of guide 53. Thus, it will be seen that the slide plates 116 form a pair of plates which conjointly may be slid forward and back in the slide guide 53, the motivation for this sliding back and forth being provided by the cylinder and piston 128–129.

Extension 132 has attached thereto one end a transfer slide rod 133 the function of which is to push a hinge 86 from the hinge receiver through hole 108 and along channel 107 in the head 100. Slide rod 133 has the same cross-sectional shape as groove 107. The inner end 134 of the slide rod 133 is tapered, as shown in FIG. 5, so that this end will be sure to ride over the hinge box 68 and the hinge receiver block 83.

The inner surface of each of the guide plates 111 is also machined to provide the mating aligned recesses 140 which match to provide a runway below the surface of guide 53, the runway terminating at each end in the slanting entrance and exit slots 141 and 142. (See FIGS. 5 and 9.)

Slidably mounted in the slot 112 is a combined anvil and push member in the form of a flat plate indicated generally by numeral 143. Plate 3 has the general shape shown, and is provided with an upwardly projecting extension 144 and a forwardly projecting elongated extension 145. Extension 144 serves as an anvil for the upward support of a hinge as it is being moved within guide 101 from a second position to a third position as will be described below, and the extension 145 is a pushing means whereby a box-shell is ejected from the machine after a hinge has been applied thereto. The thickness of the member 143 is that of the slot 112 in order to provide a sliding engagement therewith. The end of the extension 145 is provided with a cross-extension 146 (see FIG. 5), the extension 146 projecting just slightly on each side of the extension 145, and fitting with a slidable fit into the entrance and exit slots 141 and 142. The function of the lateral extensions 146 is to provide a broader surface for pushing a box-shell or box-shells from the machine, rather than the relatively thin edge of extension 145 itself, and also to retain the end of the extension 145 and the extension itself in a downward position when the anvil member 143 is moving from the dotted right-hand position shown in FIG. 5 to the left-hand full view position.

The body portion of the anvil member 143 is provided with a pair of slots 150 and 151 as shown. Slot 150 angles downwardly as shown (see FIG. 5), and slot 151 is generally triangular in shape. Passing through each of slots 150 and 151 and through the slot 112 are the guide pins 152 and 153. The ends of pins 152 and 153 are engaged in suitably provided bearing holes 154 and 155 respectively, in the slide plates 116.

Thus, when the slide plates 116 are moved in a forward direction on the apparatus (that is, to the right as viewed in FIG. 5) the pins 152 and 153 will be carried with the slide plates 116 and thus move member 143 in a forward direction. This forward direction continues until the lower forward corner 156 of member 143 strikes the inner edge 157 of the spacer 114 at the right hand end of the guide member 53. (It will be noticed that the front and rear edges of the member 143 are tapered toward each other in an upward direction, thus providing clearances for the corners 156 and the other lower corner 158.) When corner 156 strikes the inner edge of 157 as indicated above, the result is to tilt the anvil member clockwise (as viewed in FIG. 5) about the pivot 152 so that the anvil extension 144 projects directly upwardly, the extension 146 entering the slot 141 when this stage of the forward progress has been reached, and resting against the bottom of the slot 140. In this position of member 143, the anvil 144 has assumed the position shown in FIGS. 28 and 30, and in FIG. 32. The top edge of the anvil 144 is now in position to receive thereon a hinge when the hinge is brought down from its second position to bear against the top of the anvil as shown in FIG. 33. Further motion of the anvil 144 will be described later in connection with the description of the motion of the working fingers and push plates of the first positioning means 25.

On the other hand, when the piston 128 is retracted with the cylinder 129, it draws with it the slide plates 116, and these in turn by means of the pins 152 and 153, pull the member 143 to the left as viewed in FIG. 5, thus drawing the extension 146 along the slot 140 until a position is reached at which the corner 158 strikes the separator plate 135. The result of this, combined with further motion backward by motion of the slide plates 116, is to raise the extension 146 at the end of extending arm 145 into the full line position shown in FIG. 5. However, on the next cycle of the cylinder and piston 128–229 which will move the plates 116 forward to transfer another hinge into guide 101, the anvil member 143 is again conveyed forwardly of the machine (to the right as viewed in FIG. 5) with the extension 146 riding along the top of the guide member 53. In this position, the extensions 146 are positioned to strike the hinged box or a hinged shell, to move the box outwardly of the machine (that is, to the right as viewed in FIG. 5). Continued further motion of the piston 128 will again cause the anvil extension 144 to rise upwardly with concomitant motion downwardly of the extension 146 in slot 141, so that the anvil 144 is again positioned to receive the next hinge.

To permit the downward extension 126 on the slide plate 116 to move along the plate as indicated above, a suitable slot 159 (or opening) is provided in the base 2.

Figure 6:
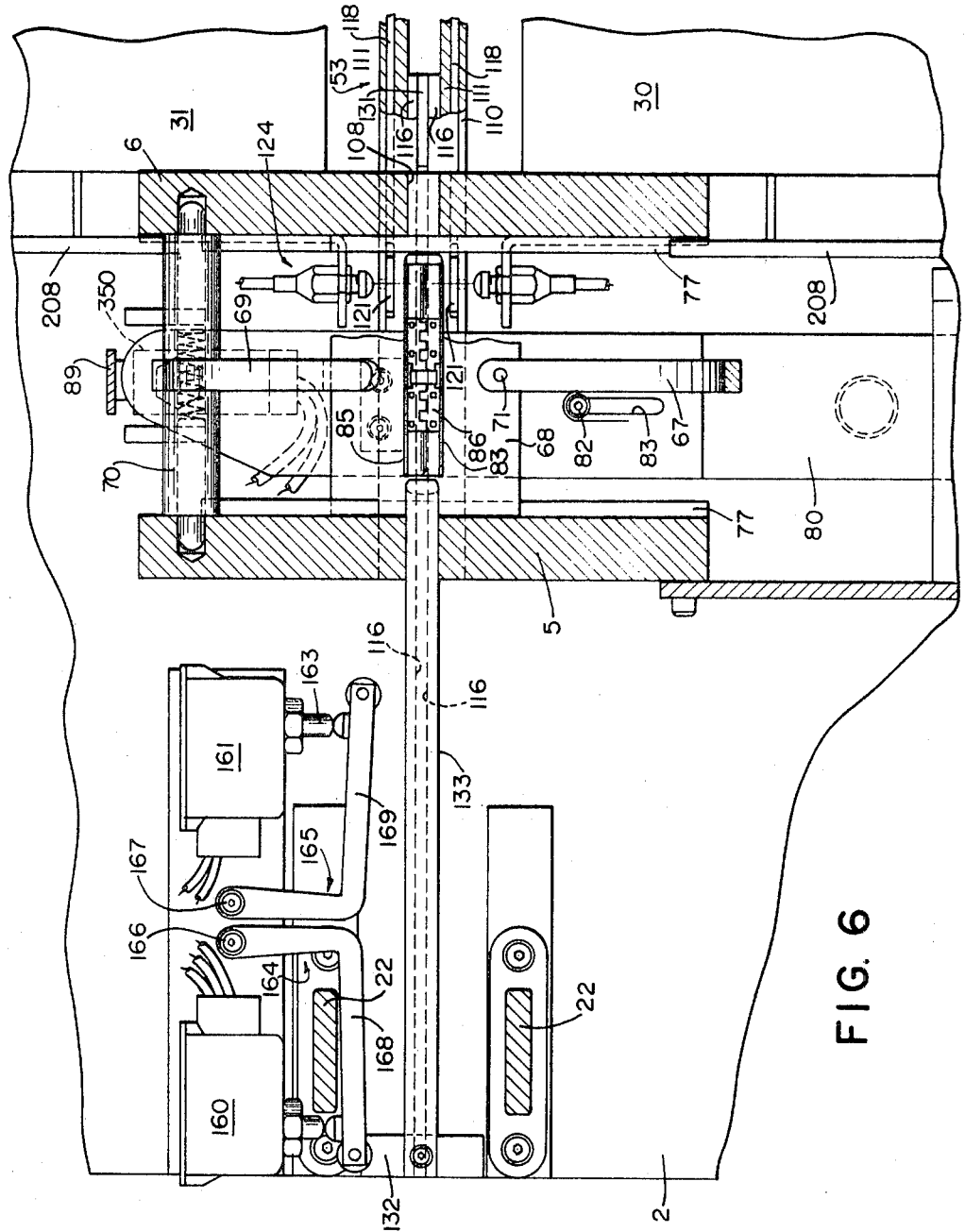
FIG. 6 is a plan view, partly sectional, and having the conveying drum removed, of the FIG. 5 view, taken in the direction of sight lines 6—6 on FIG. 5.

Attached on suitable brackets to the base 2 are a pair of electrical switches 160 and 161, the plungers 162 and 163 respectively of these two switches being pointed toward the slide plates 116 (see FIG. 6). A pair of bell cranks 164 and 165 are suitably pivoted on the base 2 by pivots 166 and 167 respectively, the arm 168 of crank 164 pointing to the rear of the machine, and the arm 169 of crank 165 pointing forwardly of the machine. Each of these arms has a conventional roller shown at the end. The arms 168 and 169 are so positioned and adjusted that when the guide plates 116 are at the furthest position to the rear, the upward rear extension 132 contacts the roller at the end of arm 168 to depress the plunger 162 of switch 160. On the other hand, when the slide plates 116 are at their forward position, the extension 132 will escape arm 168, but engage the roller at the end of arm 169 to depress the plunger 163 and actuate switch 161. The effect of these several motions will be described later in discussing the control and wiring circuits.

Referring now to FIGS. 1, 21–23 and 24, in this embodiment, the third part of the guide means being described under this Article III comprises a pair of tables 30 and 31, the function of which is to support pressure pads to hold box shells against the surfaces 102 and 103 of head member 24, and also to provide automatic aligning means to longitudinally position a single box shell or a pair of box shells on the machine properly to receive a hinge on the prongs or tabs of the box shell. The construction of one of these tables will now be described, since except for one part, the other table is identical.

Table 31 is illustrated in the drawings and comprises a top plate 172 having attached thereto by a conventional means such as screws 173 the side 174. A supporting plate 175 is fastened conventionally by means of screws 176 to the bottom of the sides 174 as shown in FIGS. 22 and 23.

Within the enclosure thus formed by the top plate 172 and the bottom plate 175, and slidable immediately adjacent the under surface of the top 172 is a movable plate 177, this plate being guided in its motion longitudinally along the table by means of the inside surfaces of the sides 174. Slidable against the bottom surface of plate 177 are a pair of guide fingers 178 and 181 (one at each side of the plate) next a cam plate 179 and finally a second pair of guide fingers 180 and 182. The guide fingers 178 and 182 both lie at one side of the table, and guide fingers 180 and 181 lie at the other side of the table.

A cross bar 184 lies across the rear end of each table (see FIGS. 22 and 23) and is spaced from the underside of the top plate 172 in order to permit sliding room for the above described plates and fingers. The bar 184 may conveniently be fastened between the side 174 by means of conventional machine screws. Each of the guide fingers 178, 180, 181 and 182 is provided with a slot 186 at its end, these slots being slidable on pins 187 mounted in the cross bar 184 so as to guide the motion of the fingers for the length of the slot, and then stop any longitudinal motion of each of the fingers when the end of the slots 186 strikes the pins 187.

The cam plate 179 is provided with the diagonal cam slots 188 in which are slidably fitted the follower 189. The rollers 189 are pinned rotatably to the fingers 178, 180, 181 and 182 by means of pins 190.

A pneumatic or hydraulic cylinder 191 has its end fastened to the cross bar 184 by means of the conventional tie bolts 192. The piston 193 has a clevis 194 attached at its end and locked thereon by means of the lock nut 195. The clevis straddles a fork 196 and is pinned thereto by conventional pin 202, the fork 196 being, in turn, attached by conventional means to the box pad plate 177. Thus, when the piston is extended by fluid pressure in the cylinder, the plate 177 is moved by the piston toward the right-hand end (as viewed in FIGS. 22 and 23) of the table. The sides of the clevis are slotted to receive a cross bar 197 the function of which when moved by the piston of the cylinder, is to pull on a pair or rods 198, having their ends threaded into the ends of the cross bar 197 and held securely therein by means of the lock nuts 199. The rods slide through suitably provided holes 200 in a cam-plate actuating bar 201 which is fastened, as by means of the machine screws 202, to the cam plate 179. At the other end of the tie rods 198 are provided nuts 204 and between the nuts and the cam plate bar 201 are provided the compression springs 205 are mounted on the tie rods 198.

As a result of this construction, when the piston advances in its cylinder, it moves the cross bar 197 to the right (as viewed in FIG. 22) which pulls on the tie rods 198. Pulling the tie rods 198 drives the springs 205 to the right, and these will then resiliently urge the cam-plate bar 201 to the right, thus driving the cam itself to the right. In its motion, the cam-plate bar 201 slides on the bottom plate 175.

Figure 21:
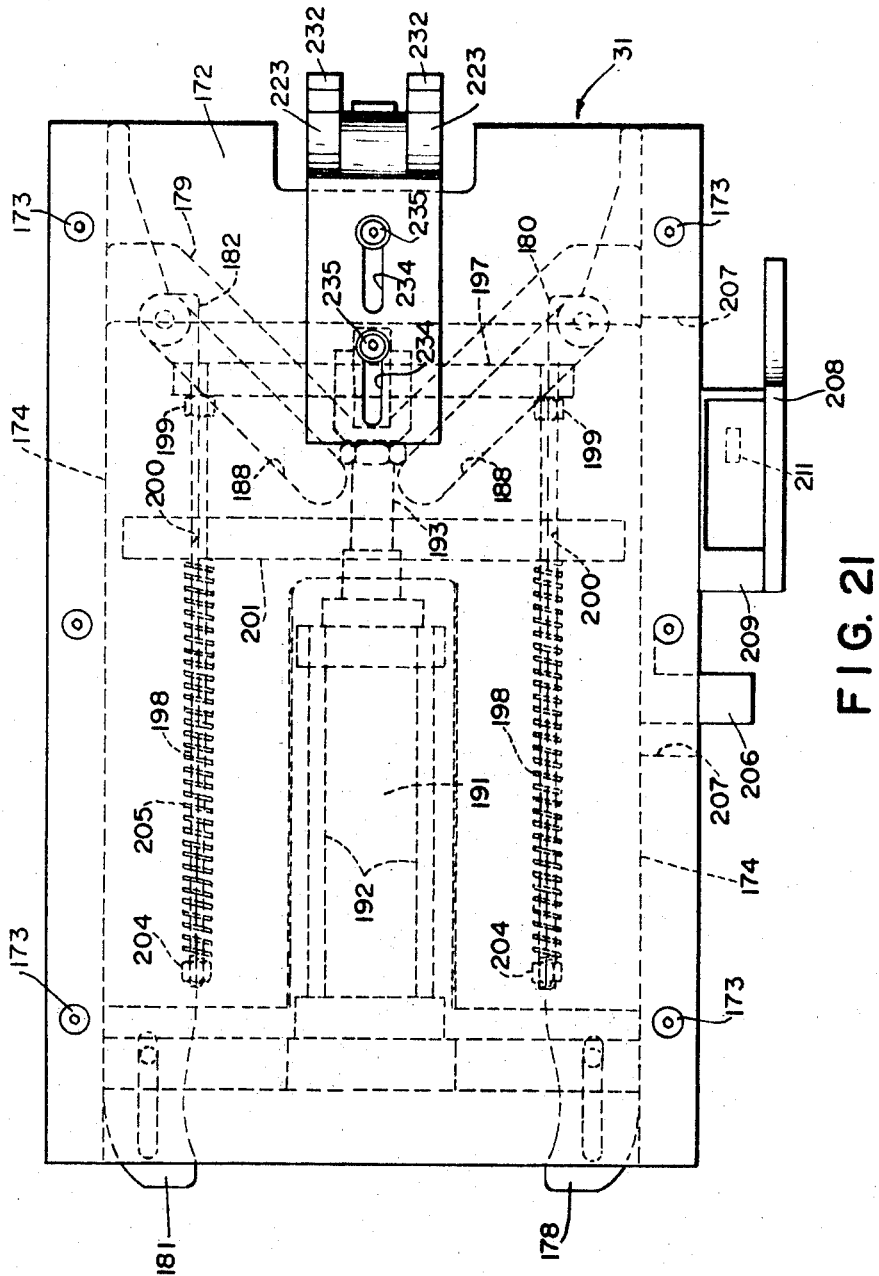
FIG. 21 is a top plan view of a table used on the apparatus for accurately positioning a box shell on the machine.

Formed as an integral part of the box pad plate 177 and extending from the side thereof is a finger 206 which, as will be observed in FIG. 21, extends outwardly from the table itself. The finger 206 slides in a suitably provided rabbet or slot 207 in the side 174 so that the finger 206 may move to the right (as viewed in FIG. 21) as the piston moves the plate 177 to the right. Attached to the side 174 and extending laterally of the table is an L-shaped bracket, the bracket extending upwardly above the top level of the table. The upper portion 208 of the bracket may be, for this purpose, attached to a base 209, and the latter may be attached to the side 174 (as shown) by conventional means. An electrical switch 210 is mounted with its plunger 211 pointing downwardly toward the base 209. Switch 210 (and thus plunger 211) are so positioned on bracket 208 that when the finger 206 moves to the right (as viewed in FIG. 21) it will slide over the top surface of the base member 209 and come between the latter and the plunger 211 of the switch 210 to actuate the latter at the furthest forward stroke of the table piston. The purpose of this switch will be described below in connection with the description and operation of the wiring and control diagram.

Figure 24:
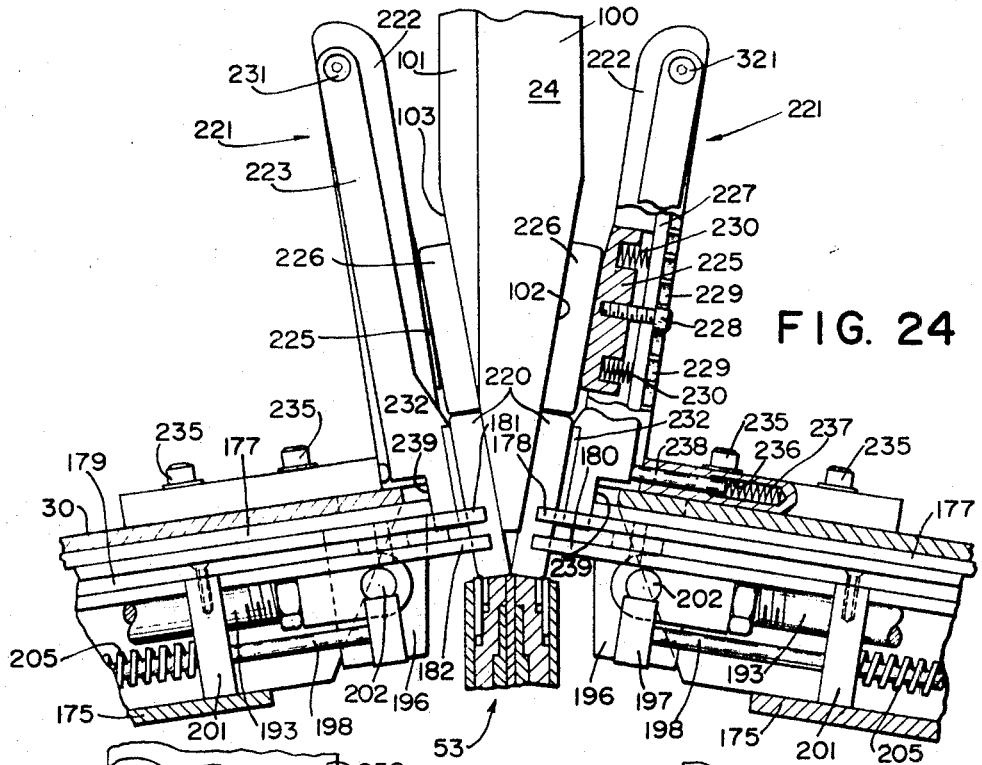
FIG. 24 is a front elevation of a portion of the operating head of the apparatus and of the tables of FIGS. 21–23, showing an operational view of these parts with box shells mounted thereon.

A reference to FIG. 24 will show these several parts having been moved to their furthest position, and shown in the dotted lines 215 and 216 on FIG. 22 are the final positions of the sets of fingers 180 and 181 on one side of the table and 178 and 182 on the other side of the table. As shown in FIG. 24 for each table, the pistons 193 have become fully extended, thus actuating the tie rods 198 which action in turn has moved the cross bars 197 toward the guide head 24, that is, toward the surfaces 102 and 103. Actuation of the tie rods 198 for each table will compress the springs 205 in each instance, thus moving the cam plate bar 201 to cause the fingers to move outwardly toward surfaces 102 and 103 and toward each other. At the same time, the outward motion of the piston has moved the forks 196 toward the surfaces 102 and 103, motion of the forks in turn moving the box pad plates 177 toward said surfaces. Also shown in FIG. 22 in dotted lines is an illustrative box shell 220 showing the box shell being gripped and held in a properly oriented position, the positioned box shell being shown also on FIG. 24.

It has been mentioned that the box pad plate for the two tables are symmetrical as are all of the parts, except in one instance, and that is that in table 30, the switch actuating finger 206 will be on the other side of the box pad plate. So also, a bracket similar to the bracket 208–209 and having a switch 212 similar to switch 210 will be properly oriented on the other side of table 30 so as to be actuated by the switch actuating finger of table 30 (see FIG. 1).

In use, the tables 30 and 31 are pivoted by the ends of the sides 174 to the upper ends of the arms 32–33 on each side of the base 2, pivoting being done as has been indicated above, by means of the pivot rods 43.

As indicated in FIG. 1, when the plates are properly positioned on the base 2, their forward ends are spaced somewhat away from the guide surfaces 102 and 103. It is between the forward ends of the tables and these guide surfaces that the box-shells are to be inserted in order to have hinges attached thereto, as shown in FIG. 24. Means must also be provided for holding these boxes snugly against the head guide surfaces 102 and 103, and these means will now be described.

Referring to FIGS. 1, 2 and 24, there are generally indicated by numeral 221 a pair of pressure pads, one on each side of head 24. Each pad mechanism comprises an upright support 222 to which are pivoted a pair of arms 223. Each of the uprights 222 is provided with a lengthwise-extending channel 224 on the side facing the guide surfaces 102 and 103, and fitted within the channels are the blocks 225 which act as pressure pads to press box shells 226 against the surfaces 102 and 103 of the guide, and thus in position to be moved downwardly along these surfaces and against the guide 53 when the shells 220 have had their hinging operation completed. A slot 227 is provided in the back surface of each of the uprights 222 this slot extending through the back surface and communicating the channels 224 of the respective upright. The slot width is made equal to the diameter of an adjusting screw 228 which is threaded into the blocks 225. The back surface of the uprights 222 is provided with a series of milled bores 229 equal in diameter to the head of the screw 228 but extending only part way through the back wall of the channel 224, thus providing a series of connected scallop-like recesses for the screw heads. A pair of springs 230 are inserted in suitably positioned bores or pockets in the pressure pad 225, the rear end of these springs bearing against a bottom of the channel 224.

As a result of this construction, when a screw 228 is properly inserted in its threaded hole in its pressure pad 225, the pad may be pressed against the bottom of the channel 224, which will free the head of the screw from the scallops 229. The pad may then be adjusted upward or downward to a desired position, and when released, the head of the screw will enter the nearest scallop in order to maintain the pad 225 in its vertical adjustment.

Each of the uprights is provided, as indicated above, with a pair of arms 223 which are pivoted near the top of the uprights by means of pivots 231 in conventional manner. Each of the arms is faced at its lower end with a pad 232 of soft material such as rubber, attachment being conventional. Pads 232 bear against the box-shells 220 in order to hold them snugly against the lower end of the guard surfaces 102 and 103, without marring the backs of the shells.

The uprights 222 are attached by a conventional means to the base member 233, the latter being provided with slots 234 through which pass the set screws 235 which are threaded into the top of tables 30 and 31. This construction permits the members 221 as a whole to be properly positioned on the tops of the tables 30 and 31 in respect to the guard surfaces of 102 and 103.

In order to resiliently bias the arms 223 toward the guard surfaces 102 and 103, spring means are provided as follows: a pair of bores 236 (see FIG. 24) are provided at the inner end of each of the base supports 233 in which are inserted compression springs 237 and push rods 238. Rods 238 are long enough to have their forward end push against the back surfaces of the ends of the pivoted arm 223. As indicated in the drawings, each of the arms 223 is cut away to provide the shoulders 239 and thus enable the ends of the arms to clear somewhat the ends of the tables 30 and 31. The push rods 238 and springs 237 provide a gentle pressure against arms 223 to permit box shells to be slid down between the pads 232 and surfaces 102 and 103. However, during a hinging operation when it is necessary for the shells to be held firmly against these surfaces, it is against shoulders 239 that the box pad plate 117 of each table presses when the piston 193 of each table is actuated, thus forcing the ends of the arms 223 firmly toward the surfaces 102 and 103 in order to hold the box shells snugly against the surfaces 102 and 103. In the meantime, as has been pointed out above, the fingers 178, 180, 181, and 182 have been previously actuated in order to properly position the shells 220 longitudinally with respect to the guide surfaces 102 and 103.

It is obvious, from the above description, that at the end of a hinging cycle, the fingers 178, 180–182 are retracted to the position shown in FIG. 21, and the box pad plate has retracted in order to relieve pressure on the ends of the arms 223, thus permitting the hinged shell or shells to be ejected from the machine.

IV.—First positioning means for moving hinge from second to third position

This article will be divided into two sections, the first referring to the slide fingers and gripping mechanisms 25, slidable in the head guide 24, and the other referring to the mechanism for actuating these members to move the hinge from its second position in head guide 24 to its third position in which it is on top of the walls of the box shells in order to be fastened thereto.

Figure 12:
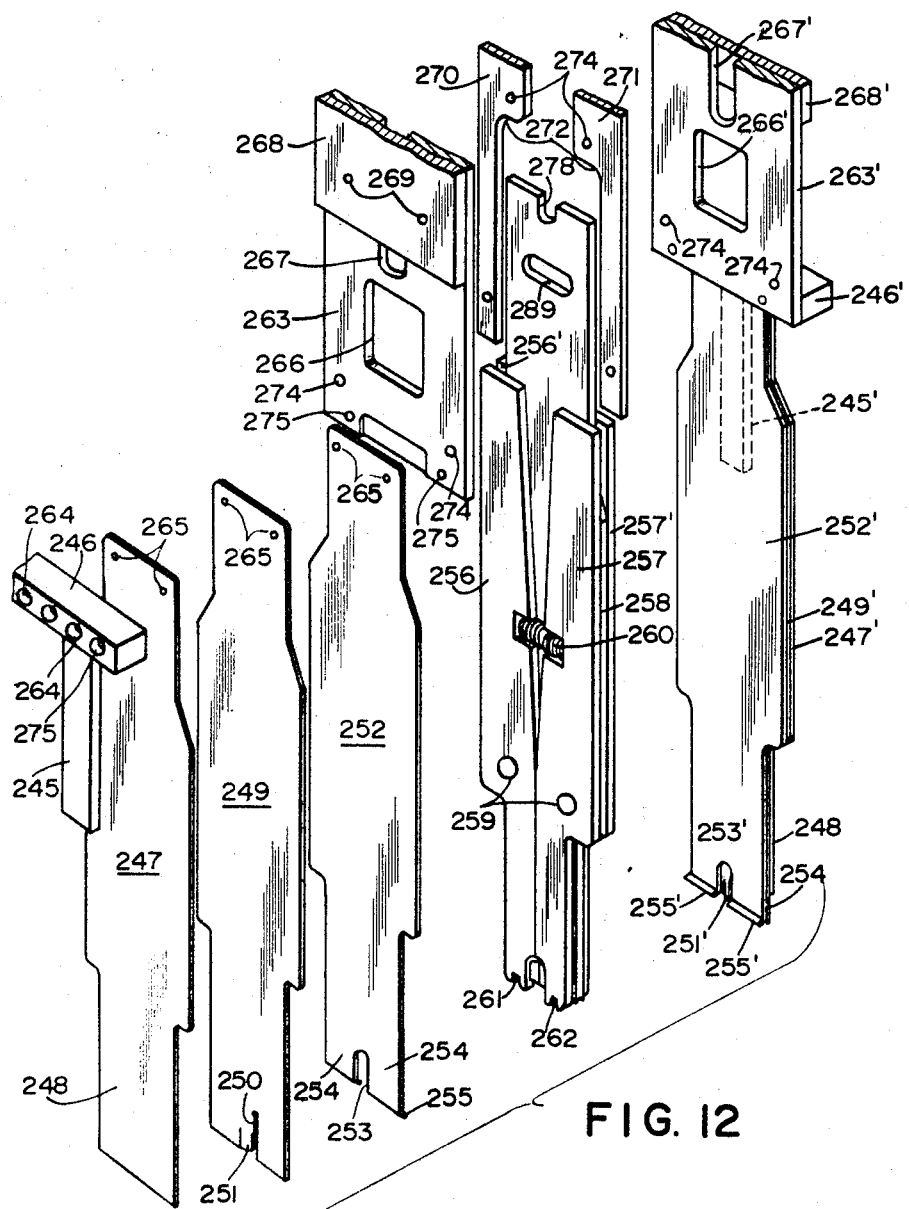
FIG. 12 is an exploded view of certain operating fingers and levers used in the aforesaid head.

Referring first to FIG. 12, there is shown an exploded view of the positioning, gripping and wiping members. These elements are held in the groove or channel 106 in the head guide member 24. Starting at the left-hand of FIG. 12, a stop bar or rod 245 is shown fastened by means of a conventional screw attachment to a cross-bar 246. Next in order is a resiliently-reinforcing spring-plate 247, the major width 247 of this plate being such as to be a sliding fit in the channel 106. It will be noted that the bottom portion 248 of the plate (and similar like parts of the other members) is made narrower than channel 106 and slightly narrower than the distance between opposing faces of inserts 135 and 136, in order to permit operation of spring-actuated lever 147 within the channel.

Next in order is a hinge positioning plate 249 of the same general shape as the spring plate 247, but provided at its lower end with a slot 250 and a tab 251 bent out from the plane of the plate, the tab 251 being used to locate a hinge longitudinally of the machine as will be described below.

Next in line as a hinge gripping finger or plate 252, having a slot 253 at its lower end to clear the tab 251 and thus also providing the finger extensions 254, each of these finger extensions being bent inwardly to provide the detents 255 which are initially used to grip a hinge as it is pushed into the head 24.

Adjacent plate 252 is a pair of crimping or wiper levers 256 and 257 and finally, in the middle of the entire assembly, is a transfer or bearing plate 258. The wiper plates 256 and 257 are pivoted to transfer plate 258 by means of suitable pins 259 passing through the levers and the transfer plate 258. Levers 256 and 257 are tapered at their upper portions so that they can pivot toward each other. A spring 260 is mounted between the plates 256 and 257 in suitable recesses in the inner edges thereof, as shown, in order to bias the upper portions of the plates 256 and 257 apart. The lower ends of the plates 256 and 257 are provided with slots 261 and 262 which are adapted to fit over upwardly extending prongs of the box shells.

Figure 11:
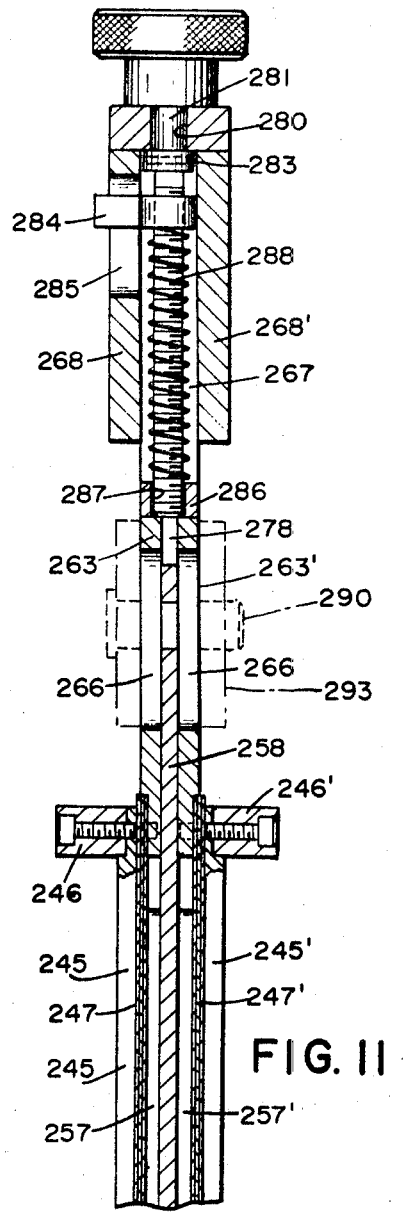
FIG. 11 is a front sectional elevation corresponding to the FIG. 10 view.

In similar fashion, on the other side of bearing or transfer plate 258 are provided a pair of wipers 256' and 257', and a series of members like those on the left-hand side of the bearing plate 258 as drawn in FIG. 11, these plates being the gripping plate 252' with its inward detents 255', positioning plate 249', spring plate 247', cross-bar 246' and stop bar 245'.

A pair of supporting plates 263 and 263' are provided to which is attached conventionally, as by screws passing through suitable holes 264 and 265 in the cross-bars 246 and 246' and in the plates 247–249 and 252, on one side of plate 258, and plates 247', 249' and 252' on the other side of plate 252, the screws threading into plates 263 and 263'. The supporting plates 263 and 263' are provided with apertures 266 and 266', the function of which is to permit motion of the bearing plate 258 with respect to the combined supporting plates 263 and 263', and their dependent plates 247, 249, 252, and 247', 249' and 252'. Plates 263 and 263' are supplied with a vertical slot 267 and 267' as shown which extend to the top of the plates (see FIGS. 10 and 11).

Attached to plate 263 and 263' are further supporting plates 268 and 268' which extend upwardly (see FIGS. 10 and 11) to the top of the head as shown, the attachment being made conventionally as by screws 269.

A pair of elongated spacers 270 and 271 are provided, each spacer being just slightly greater than the thickness of the bearing plate 258, and being shouldered as shown by numeral 272. The upper end of the support plate 258 is slidable between the spacers when the structure is put together. Plates 270 and 271 (see FIGS. 10 and 11) extend upwardly to the top of the head, terminating on the level with the supporting plates 268 and 268' and being connected together by the top closure bar 273, which is attached to the support plates 268–268' and the spacer plates 270 and 271 by a conventional means such as machine screws (not shown).

The support plates 263 and 263', the spacer plates 270 and 271 are fastened together by conventional machine screws passing through the holes 274 in the respective plates.

With the above construction, it is apparent that the combination of the wiping fingers 256, 257, 256' and 257', and the bearing plate 258 may slide vertically with respect to the combination of the supporting plates 263, 263', and the dependent fingers or plates 247, 247', 249, 249', 252, and 252'.

The cross-bars 246 and 246' are fastened conventionally to the spacer bars and the support plates 263, and 263' by machine screws in holes 275.

Figure 10:
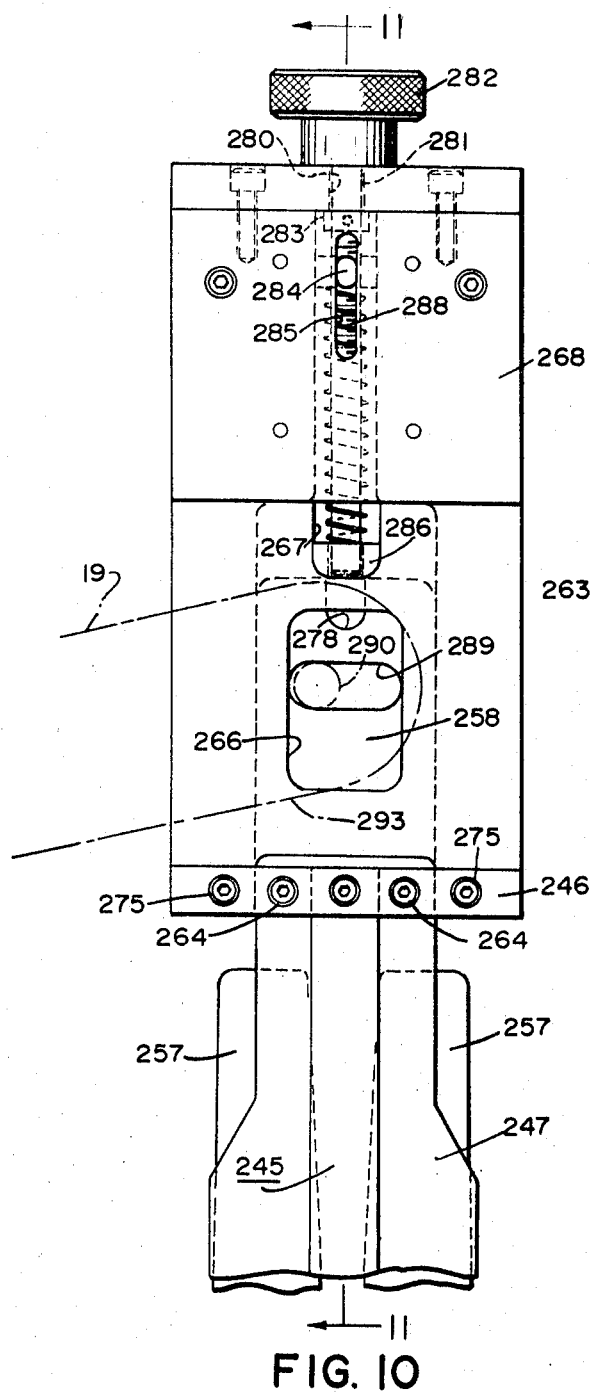
FIG. 10 is a side elevation of the upper portion of the operating head of the apparatus.

The assembly of top bar 273 and its dependent support plates 263, 263', finger plates 247, 247', 249, 249', 252 and 252' is suspended on the bearing plate 258 through an adjustable spring suspension, so that the vertical distance between the lower end plate 258 and the inturned lips 255 and 255' of plates 252 and 252' may be varied. The construction may be most clearly seen by reference to FIGS. 10 and 11, as follows:

Through a suitably provided hole 280 in the cross-bar 273 passes downwardly a threaded adjusting screw 281, the adjusting screw having fastened at its upper end a conventional adjusting knob 282 which is preferably knurled. A collar 283 is fastened by means of a set screw to the adjusting screw 281 in order to maintain it fixed axially with respect to the cross-bar 273. Threaded on the adjusting screw 281 is a combined indicator and spring compression member 284, this member extending outwardly through a slot 285 suitably provided in one of the plates 268, thus holding the member from turning when the screw 281 is turned. At the lower end of the screw 281 there rides a pressure pad 286, this pad being engaged in the slots 267 and 267' in plates 263. Pad 286 bears against the lips of slot 258. The pad is provided with a hole 287 therein through which freely passes the end of the adjusting screw 281 as shown in FIGS. 10 and 11. By turning the knob 282, the member 284 may be moved along screw 281, thus raising the plates 268, 268' and pad 286. The lower end of spring 288 bears against pad 286, with the result that the distance between the lower end of bearing plate 258 and the inturned lips 255, 255' on plates 252, 252' is shortened. Knob 282 may thus be used to adjust this distance. As indicated, spring 288 provides a spring suspension means.

With this construction, and as will be explained more fully below in a description of the operation of the device, it is apparent that the assembly of the fingers 247, 247', 249, 249', 252, and 252', the crimpers 256, 256', 257, 257', and the bearing plate 258 are free to slide as a group in the groove or channel 106 provided in the head guide 24.

The bearing plate 258 is provided with a transverse slot 289, through which passes a pin 290 which also transverses a clevis at the end of lever 293 for actuation of the plate assembly 25.

V.—Actuating means for first positioning means and crimping means

Referring now to FIGS. 1–4 and 10, 11 and 18–20 a description will now be given as an actuating means for moving the assembly 25 of fingers and plates, and for operating the crimping means.

The lever 19, as has been indicated in the discussion of the general layout of the apparatus is pivoted means of a pivot pin 20 at the top of the guide member 18 in a suitable clevis 292 provided therein. Lever 19 has a clevis 293 at the forward end thereof, this clevis enveloping the plates 263 in the finger assembly described above (See FIGS. 4 and 11) with the pin 290 passing through a suitably provided hole in clevis 293 and in slot 289, so that motion of the lever 19 will move the assembly 25 vertically up and down. The other end of lever 19 is enveloped by a suitable clevis 294 which is mounted at the end of piston 23, and pinned to the lever 19 by pin 295.

A pair of stop arms 296, one on each side of the assembly 25 are fastened to the top of guide 18 by channels 309 and conventional screws, and extend forwardly of the machine over cross-bar 246 holding the plates of assembly 25. The stop bars 296 act to position the upward motion of the assembly 25.

Referring more particularly to FIGS. 4, and 18–20, slidably mounted in the passageway 297 in the guide member 18 are the reciprocable arms 27 and 28. These arms are supported for their sliding motion forwardly and backwardly of the machine by being made a sliding fit in the passageway 297, and riding on the tops of the standards 5 and 6. Also slidably mounted in the passageway 297, is a L-shaped switch-actuating plate 298 (see FIGS. 4 and 20) this plate being a sliding fit between the inner opposing faces of the arms 27 and 28, the plate 298 also sliding on the top of standards 5 and 6 in the passageway 297.

Fastened to the arms 27 and 28 is a fluid operated cylinder 299 the end mounts 300 of which serve as spacers to hold the arms a proper distance apart so that they are a smooth sliding fit in the passageway 297. It will also be observed that the cylinder ends 300 serve as a top retaining means for the slide bar 298, allowing the latter to slide smoothly between the tops of standards 5 and 6, and the bottoms of the cylinder end pieces 300. Attachment of the cylinder ends to the arms 27, 28 is done by conventional means. Cylinder piston 301 is fastened to the upwardly extending end 302 of the plate 298 by means of a clevis 303 and a lock nut 304 (see FIG. 20). Clevis 303 extends toward the head structure 26 described above (and including assembly 25), and passing therethrough is a pin 305 on which are mounted the bushings 306 on the outside of the clevis and the central bushing 307. The ends of the pin 305 slide in a pair of slots 308 which are provided in the arms 27 and 28 are shown.

At the forward end of the arms 27 and 28 is mounted a bushing 311, this being held at the end of the arms by means of a conventionally provided pin 312 mounted in suitable holes in the bar.

With the above construction, it will be noted that the bushings 307 and 311 lie on either side of the upper ends of the crimping plates 256, 256′, 257 and 257′. (See FIG. 19.) Thus, if the bushings 307 and 311 are moved toward each other, the upper ends of crimping plates will be moved toward each other and the lower ends of the crimping plates will be spread apart.

The view shown in FIG. 18 shows the head mechanism 26 in its uppermost position against the stops 296, and in this position it will be noted that the upper end portions of the crimping or wiping plates are above bushings 307 and 311. However, in the view shown in FIG. 20, the head structure 26 has been moved downwardly by operation of the machine to bring assembly 25 down, and it will be observed that the bushings 307 and 311 are now opposite the upper end portions of the wiping plates 256, 256′, 257, and 257′. In FIG. 20, also, it will be noted that the cylinder 299 has been actuated to bring the bushings 307 and 311 toward each other, with the result that these bushings, squeezing the upper ends of the wiper plates together, cause these plates to pivot about their pivot pins 259, and thus cause their lower ends to spread apart as shown in FIG. 20 and also in FIG. 37, the latter view showing the lower ends of the crimping or wiping bars spread far enough apart to bend over the prongs 317 of a box shell in order to attach the hinge to the box shell.

As viewed in FIG. 20, the bushings 307 and 311 are in an intermediate position but about to reach the end of their approach to each other. The final positions of these bushings and their final separation is determined by the width of the bearing plate 258, since this plate is fixed with regard to the longitudinal axis of the machine, that is, the plate 258 is permitted to move only vertically up and down, and not toward or away from the standards 5 and 6.

For this reason, the stop position of the bushing 307 is the left-hand edge of the plate 258 as viewed in FIG. 20, and the stop position of the bushing 311 is the right-hand edge of that plate. When the bushings have come to a stop against the edges of plate 258, it will be observed that the upper ends of the crimping plates will be moved closest together, thus spreading the lower ends of these crimping plates the furthest apart. It is in this final position that the prongs 317 of the box shell are fully bent over and wiped or crimped down onto the hinge.

Referring again to FIG. 19, at the left-hand end of the slidable plate 298 there is mounted a cross-arm 314 which extends beyond the edge of the plate. Adjustably threaded into the end of the arm 314 is an adjusting screw 315, the screw being held in adjusted position by means of a conventional lock nut as shown. A push-button switch 313 is mounted at the end of arm 27, as shown, and positioned to have its push button 316 actuated by the screw 315 upon relative motion between the sliding plate 298 and arm 27. Actuation of switch 313 takes place when the bushings 307 and 311 have come to rest against the edges of the support bar 258, and upon actuation of switch 317 all cylinders in the machine are caused to retract their pistons to an original starting position, as will be described below in connection with the wiring and control diagram of the machine.

Figure 4:
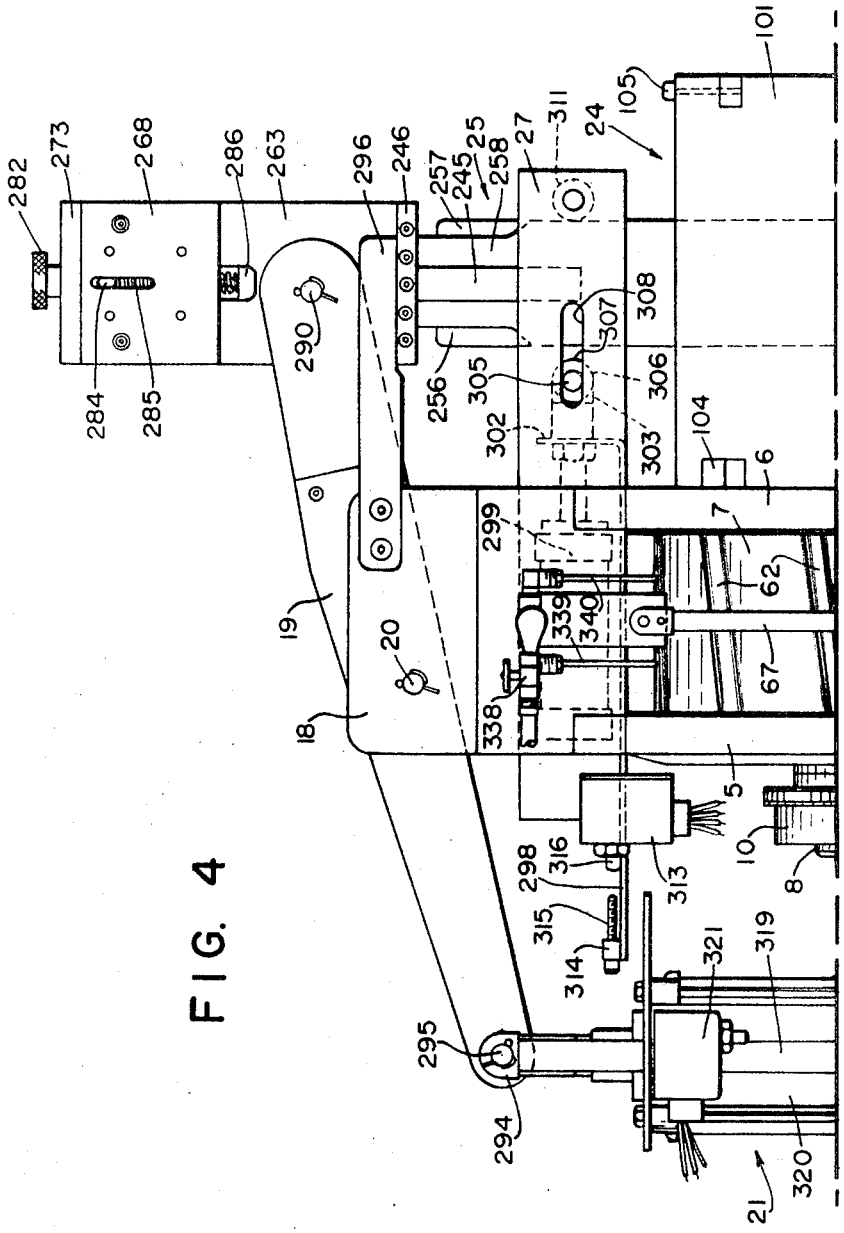
FIG. 4 is a side elevation of the upper portion of the FIG. 1 embodiment, enlarged in order to show certain detail in greater clarity.
Figure 4A:
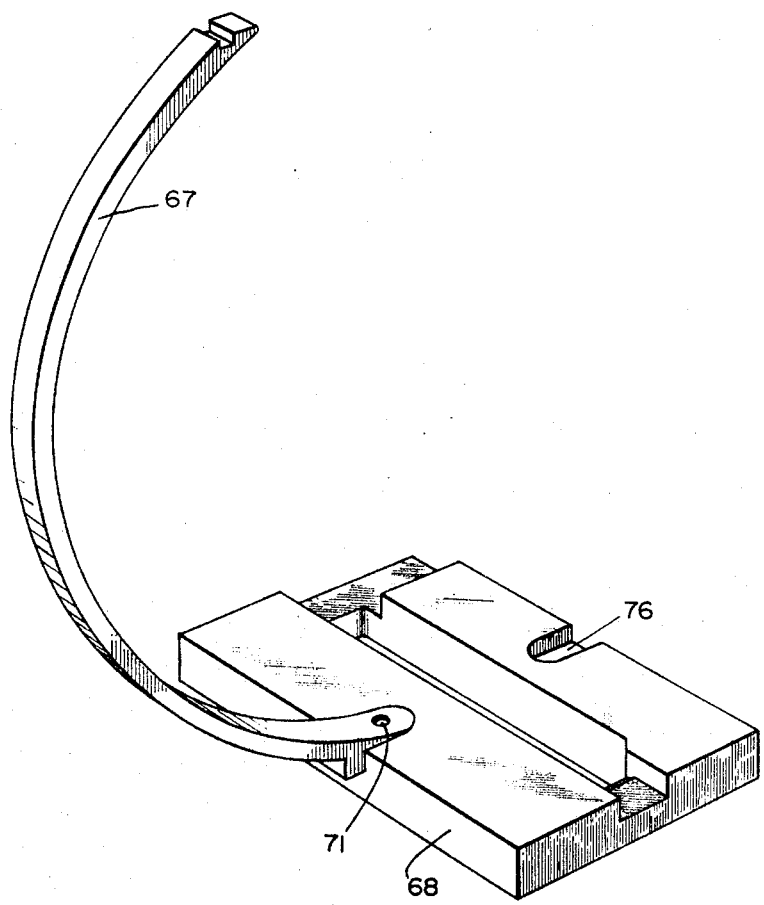
FIG. 4(a) is an illustrative view of a guide member used on the machine, this guide member being removed from FIG. 2 for purposes of clarity.

Referring to FIGS. 2, 3 and 4, attached to clevis 294 (on piston 23 of cylinder 21) is a laterally extending short arm 318, and extending downwardly from the end thereof is the slide-bar 319, the latter being guided in its motion by a grooved bearing-plate 320 suitably fastened to the side of cylinder 21.

A pair of switches 321 and 322 are mounted on plate 320, and positioned so their operating plungers face each other but are not in vertical alignment, (all as shown in FIG. 2). Mounted on slide-bar 319 is a switch actuating bar 323 having threaded therethrough the adjustable switch-actuating screws 324 and 325, these being secured in adjusted position by conventional locknuts. Screw 324 is adjusted so that when piston 23 is fully retracted in cylinder 21, switch 322 is actuated; and screw 325 is adjusted so that when piston 23 is extended far enough to move bearing plate 258 downward sufficient to transfer a hinge to its third position (on the box shells), then at that point switch 321 is actuated.

VI.—Pick-off means for misplaced hinge

Referring to FIGS. 1, 3, 4 and 7, there will now be described apparatus for removing from the drum 7 a hinge which has been placed in a groove 62 in a wrong position, for example, with one leaf extending directly outwardly from the drum, or possibly with the hinge inverted in the groove with the pintle projecting outwardly. An electromagnet 331 is mounted between the standards 5 and 6 in conventional manner, as by a cross-member 332 and having its pole-face 333 overlying each depression of the drum as the drum rotates. The magnet is designed so that when energized, it will have sufficient strength to pull a misplaced hinge away from the drum by overcoming the pull of the magnets 66 underneath each groove.

Magnet 331 is actuated by a photocell-relay circuit, the photocell 334 being mounted on standard 6 as shown in FIG. 1, and a light source 335 being mounted on standard 5 opposite to the photocell. Each of standards 5 and 6 is provided with apertures 336 and 337 lying just outside, the photocell and its light source being axially aligned with these apertures.

Mounted at the top of standards 5 and 6 (see FIG. 4) a combined electromagnetic and air distributing air valve 338 having a pair of tubular outlets 339 and 340 which extend over the top of drum 7 and end proximate to the pole-face 333.

When the light reaching the photocell is interrupted by an incorrectly placed hinge, the air-valve 338 is actuated at the same time the electromagnet 331 is actuated. The latter moves the misplaced hinge away from the pertinent groove, and as the holding force of the pertinent magnet 66 is overcome, the blast of air from the outlets 339 and 334 blow the hinge away from the drum and back into the supply source 29. Once the hinge is removed, light can again strike the photocell with the result that the magnet 331 becomes deenergized, and air is shut off by valve 338.

VII.—Control and wiring diagram

Figure 37:
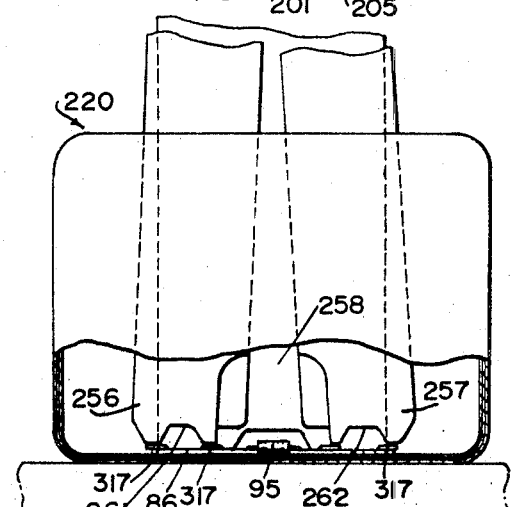
FIG. 37 is a view similar to FIG. 36, but showing the position of the crimping levers at the end of a crimping or wiping operation with the box shell tabs or prongs being bent over to fasten the hinge to the box shell.

For convenience in wiring, use has been made of low voltage direct current such as may be derived from a transformer and rectifier assembly well known in the art, which is schematically indicated in FIG. 37 by numeral 345. One side of this power supply is shown connected to the various switches and solenoid valves of the apparatus, and for convenience of illustration the other side is shown as grounded, each of the control solenoid valves having its common terminal similarly grounded.

Four electrically controlled solenoid valves 346, 347, 348 and 349 are shown, each of these being double acting in the sense that it requires an electrical impulse at one terminal to actuate the valve into one control position, and another electrical impulse at the other terminal to actuate the valve into its second control position. Each of the hydraulic or pneumatic cylinders that is controlled by the valves is double-acting cylinder, that is, it requires pressure on one side of its piston to drive the piston in one direction, and in order to return the piston to its original position, pressure must be applied to the other side of the piston. It is the function of each of the said valves to provide the respective air or oil pressures properly in the cylinders under the control of the several switches. Consequently, the terminals of each of the valves has been lettered A and R, letter A standing for piston advance, and letter R standing for piston retract. When the A terminal of the valve is energized, the respective cylinder will be actuated to move its piston outwardly. When the R terminal of the same valve is energized, the cylinder will retract its piston.

Throughout, the switches used are single-pole single-throw and single-pole double-throw snap acting switches of any of the several kinds conventionally available on the market. All cylinders (heads, hinge slide, table, and crimp) are in their retracted position at the start of a machine operation to fasten a hinge to a box shell.

With the above in mind and referring to FIG. 38, power flows from the source 345 via connection 349 to switch 94 which is normally open, but which is closed by the action of the hinge receiver 83 when the latter is pushed downwardly by the receipt of a hinge from the drum 7. From switch 94, connection 351 leads to switch 92 which is actuated by the hinge conveying drum 7 each time a hinge becomes positioned in the hinge receiver 83 and the drum has continued to rotate. With switches 92 and 94 closed, power flows by means of connection 353 to switch 160 which is held in closed position when the hinge slide cylinder 129 is in its retracted position. Since switch 160 is closed, power then flows via connection 355 to valve 246 which actuates the slide cylinder 129, the power connection to the common terminal of the valve being made through the grounded connection as shown.

The slide cylinder 249 now being actuated, its piston 128 moves the slide 133 to transfer a hinge from the hinge receiver 83 along channel 107 to the interior of the guide head 24, where it is placed between the gripping fingers 252 and 252' as set forth above. When the slide has thus positioned the hinge in the head, the slide cylinder piston has moved far enough to close switch 161 and open switch 160. Power now flows from power supply 345 via connection 357, connection 358, switch 322 (which is a normally open switch but which is held closed when piston 23 (of cylinder 21) is in its retracted position), connection 360, and connection 361, to switch 161. Since switch 161 has been closed by the forward motion of slide 116 and bracket 132, power now flows via connection 362 to the relay switch 363 actuated by photocell 123. However, as indicated above, this switch will be in open position until a pair of box shells properly are placed in position, as shown in FIGS. 32–35, to actuate shutter levers 118 to align the window 122 in the levers with the window in the slide guide bar 53, and thus actuate the photocell to close its relay 363. Upon the closure of the latter, power then flows via connection 364 to valve 347 which controls the table cylinders 191 in tables 30 and 31.

The table cylinders are now actuated to move the fingers 178, 180, 181 and 182 toward head 24 and inwardly in order to position the box shells properly against the head, all as described above. When the fingers have moved this far, the laterally extending fingers 206 of the tables continue to move to close the table switches 210 and 212. Upon the closure of these switches, power then flows via connection 357, connection 358, switch 322, connection 360, connection 367, table switch 210, connection 368, table switch 212, and connection 369 to head valve 348 which is the one that controls head cylinder 21 which operates the rocker arm 19. Energization of the advance side of valve 348 actuates head cylinder 21 to move rocket arm 19 and thus move head 26 downwardly to actuate the fingers and crimping assembly 25, and to move the hinge 86 from the second position to the third position on the tabs 317 of the box shells.

As the piston 23 of the cylinder 21 moves upwardly, the switch 322 opens, and at the outermost end of the stroke of this piston, the switch 321 (which is a normally open switch) is closed. Power now flows from the source 345 via connection 357, connection 371, switch 313 (which is a normally closed switch when the piston 301 of crimp cylinder 299 is in its retracted position), connection 373, switch 321, and connection 374 to valve 349 which is the valve that controls the crimp cylinder 299.

Upon the actuation of crimp valve 349, crimp cylinder 299 is actuated to move bushings 307 and 311 toward each other to move the upper ends of the crimping levers 256 and 257 together, thus causing their lower ends to wipe the box tabs 317 over the hinge 86, thus fastening the hinge to the box shells. When the wiping has been completed, the piston of the crimp cylinder 299 will have advanced far enough to actuate the switch 313 to open one set of contacts and to close its other contacts which immediately transfers power from the source 345 via connections 357, 371, switch 313 and connections 375–380 inclusive to the retract side of each of the several solenoid valves. This immediately retracts the pistons of all cylinders (head cylinder 21, hinge slide cylinder 129, table cylinders 191, and crimp cylinder 299) to their retracted position which is their starting condition in this description. When these cylinders are retracted, the following happens in respect to the several switches; switches 210 and 212 are opened, switch 160 closes, switch 161 opens, switch 322 closes, switch 321 opens, and switch 313 moves its contacts to the position shown in FIG. 37.

When the hinged together box shells are now ejected from the machine as described below, this causes the shutter levers 118 to raise their outer ends, thus lowering their inner ends across the light-line of the photocell 123, with the result that the photoelectric cell relay 363 opens.

The function of the switch 92 is to act, in a sense, as a time delay switch in respect to the firing time of the slide cylinder 129. In order to prevent this slide cylinder from operating prematurely so that a hinge would not be in position to be transferred by the end of the slide to the interior of the head, switch 92 is so mounted and adjusted that it is closed by the rotation of the drum 7 when the hinge receiver 83 is approximately midway between two adjacent grooves 62 in the drum. It is at this time, and only this time, that the hinge slide 133 can transfer the hinge from the hinge receiver as aforesaid, and for such transfer to take place, all of the other switches in sequence must have been operated.

Referring now to FIG. 38, a schematic wiring diagram from the pick-off mechanism for misplaced hinges is shown. 9 step-down transformer 385 is used to provide a low voltage control circuit, one side of the secondary of which is grounded as at 386. The other side of the secondary is connected via connection 387 to one side of an electromagnetic relay 388, the other side of this magnet being connected via lead 389 to the photocell 334 and its control circuit. Lead 387 is also connected to the contact arm of relay 388, and to lead 390 which supplies continuous power to the light source 335. The stationary contact of relay 388 is connected to one side of pick-off magnet 331, the other side of which is grounded. Stationary contact is also connected to the valve 338 by connection 391.

Thus, when the light-beam through the orifices 336 and 337 in standards 6 and 5, respectively, is interrupted by a hinge wrongly positioned in groove 62, photocell 334 actuates relay 388 to close its contacts. This energizes magnet 331 which picks the hinge off the drum 7. Also energized is the valve 338 which opens to permit air to blow through tubes 339 and 340 to blow the hinge off the face of magnet 331 and back into the hinge supply 29. When the hinge is removed from the groove, the photocell again receives light and magnet 331 and relay coil 388 are deenergized.

VIII.—Operation

The operation of the control circuit has been described above and will not be repeated here, since a complete cycle of the machine is thus described. What is important at this point is to describe the cycling of the machine as it pertains to taking a hinge from the drum 7 into the hinge receiver and then into the head 24, the hinge then being positioned accurately by lever 147, and thereafter being moved forwardly so as to overlie the prongs 317 of the box shells. This operation will now be given.

Referring to FIG. 5, a hinge 86 is shown positioned in the hinge receiver with the slide bar 133 about to be moved by the piston 128 and arm 132 from left to right as viewed in FIG. 5. Piston 128 is actuated in suitable sequence, as given above, and the slide bar 133 moves the hinge into the head 24 as described above, moving lever 147 to the right and compressing spring 149. It will be noted that at the same time that the hinge is moving into the head 24, the anvil and pusher member 143 is also being moved from left to right as viewed in FIG. 5, with the result that the end 146 of this member strikes a box which may still be in the apparatus and which has previously had its hinge applied. Forward motion of the member 143 will thus eject the box from the machine. Ejection of the box from the machine will release levers 118 and permit light passage to open the photocell relay as described above, with the result that another pair of shells (on this embodiment which uses two of the shutter levers 118) must be inserted on the machine before any cycling can take place. As described above, when the hinge is moved into the head 24, it is moved all the way to the right side of the channel as viewed in FIGS. 28 and 29. In this position, it has depressed the lever 147 against the bias of latter's spring 149. It will be observed that the tongues 251 and 251' at the ends of the fingers 249 and 249' on each side of the hinge have now been enabled to snap into the central slots 96 of the hinge leaves (these slots being provided, as is conventional), in order to provide a place for the ends of the C spring 95 to grip the leaves of the hinge). The views shown in FIGS. 28 and 29 indicate that in this position, the hinge is further to the right in the head channel between inserts 135 and 136 than it is when it is placed over prongs 137. When the hinge is moved downwardly toward the prongs, the hinge moves past the end of slide 133, and lever 147 now will push the hinge to the left as viewed in FIGS. 28 and 29 until the tongues 251 and 251' engage the edges of the slots 96. At this position, the tongues 251 and 251' stop any leftward motion (see FIGS. 30 and 31) of the hinge, and bring the hinge to its predetermined adjusted position prior to moving further downward to overlie the prongs of the box-shells.

The reason that this is done is that in the manufacture of the hinges themselves, it is found that it is much easier and more accurate to use the slots 96 as the indexing means when the prong receiving holes are punched in the hinge. The result is that the most accurate way of positioning the hinge in the head 24 is the aforesaid one, in which the tongues 251 and 251' serve as the final locating stops for the hinge before moving the hinge downward to overlie the prongs.

Referring now to FIGS. 32–35, the hinge 86 is shown (see FIG. 32) in the second position in the head 24, and it will be noticed that the leaves of the hinge are engaged by the inwardly turned ends or detents 255 and 255' of the gripping fingers 252 and 252'. It will be also noticed that the bearing plate 288 has its end in engagement with the barrel of the hinge. Upon actuation of the head cylinder 21 and thus the piston 23, the rocker arm 19 is rotated to move bearing plate 258 downwardly, the assembly of plates 247, 247', 249, 249', 252 and 252' moving downwardly also to the position shown in FIG. 33, at which point it will be observed that the barrel of the hinge has come in contact with the top of the anvil 144.

As, now, the rocker arm 19 continues to move the bearing plate 258 and wiper plates 256, 257 and 256', 257' downwardly, the stop bars 245 strike the top of the head member 24, and thus stop any further downward motion of the assemblies of plates 247, 249, and 252 on one side of plate 258, and corresponding plates 247', 249', and 252' on the other side. These are stopped, therefore, in the position shown in FIG. 33, but meanwhile the bearing plate 258 and wiper plates continue to move downwardly, moving the hinge with it and also the anvil 144. This motion downward is resisted by the anvil because when the anvil pusher member 143 is pushed downwardly, the effect of the forwardly inclined edges of slots 150 and 151 in the member is to cam the slide bar 116 backwardly against the resistance of the piston 128 which, of course, is being urged outwardly by the fluid (preferably air) of the cylinder 29. Thus, as the hinge is moved downwardly from its FIG. 23 position to its FIG. 34 position, it is securely gripped between the end of the support bar 258 and the top of the anvil. However, because plates 252 and 252' are stopped, the hinge escapes the detents 255.

As the hinge escapes the detents 255, 255' of the plates 252, 252', it will be observed that the effect is to spread the leaves of the hinge as shown in FIG. 34. While in this spread position, and before these leaves can move back to their angular relationship shown in FIG. 33, the hinge is snapped down by the bearing plate 258 to lie against the walls of the box shells as shown in FIG. 35, in which position the holes in the hinge have enveloped the prongs 317 of the box shells. At this point, the motion of the rocker arm 19 ceases but it stays stationary to maintain the hinges in the FIG. 31 position while a crimping action takes place.

Figure 36:
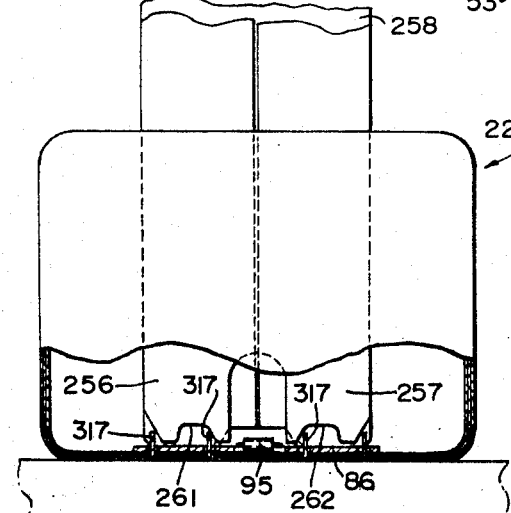
FIG. 36 is an enlarged side elevation, partly in section, showing the ends of the crimping levers prior to a crimping operation (as in FIG. 35)

Referring now to FIGS. 36 and 37, the view of the assembly shown in FIG. 36 is that just after the hinge has been placed down over the prongs of the box shell walls. The slots 261 and 262 at the end of the crimping plates now overlie the box-shell prongs, and the slanting camming ends in between the slots, as shown. At this point, and because the upward motion of the piston 23 of the cylinder 21 has closed switch 321, the crimping cylinder 299 is actuated to squeeze the upper ends of the pairs of crimping fingers 256–257 and 256′–257′, with the result that the lower ends of these fingers are spread apart as shown in FIG. 37 to bend the prongs of the shell boxes and the hinges with a wiping action in order to fasten the leaves of the hinges to the walls of the box-shells. Upon actuation of the crimping cylinder to the FIG. 37 position, the switch 313 is actuated, as described above, to return all parts to their initial position.

In view of the above it will be seen that the several objects of the invention are achieved and other advantageous results attained.

It is to be understood that the invention is not limited in is application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Having described the invention, what is claimed is:

1. Apparatus for attaching a hinge to a box shell, a wall of the shell being provided with raised tabs and at least one hinge leaf being provided with holes spaced to register with the tabs, comprising:
   a base;
   means associated with the base for conveying a hinge to a first position;
   guide means on the base for aligning said box shell on the base remotely from said first position in a predetermined angular relationship to the base;
   transfer means for moving said hinge from said first position to a second position in which said holes are in alignment with said tabs;
   first positioning means for moving said hinge from said second position to a third position in which said hinge is pressed against said wall with the tabs projecting through said holes;
   wiping means for bending said tabs over the hinge leaf to fasten the hinge to said wall;
   control means for sequentially operating said transfer means, positioning means, and wiping means, in the order given; and
   means interlocking with said control means whereby said control means is inoperative to operate said first positioning means and said wiping means until said box shell is aligned by said guide means on said base in position to receive the hinge properly from said positioning means.

2. The apparatus of claim 1, in which said means for conveying a hinge to a first position in a cylinder rotatable in respect to the base on a horizontal axis.

3. The apparatus of claim 2 in which the peripheral surface of the cylinder is provided with a plurality of depressions each shaped to receive therein a hinge, the lengthwise axis of each depression being at a skew angle to the axis of the cylinder.

4. The apparatus of claim 3, including means for holding said hinges in said depressions on the cylinder, said holding means comprising a permanent magnet in the body of the cylinder adjacent each of said depressions and so spaced with respect thereto that the magnetic field of said magnet will hold the hinge in the depression when the hinge is made of magnetic material.

5. The apparatus of claim 1, in which said transfer means comprises an elongated slide member adapted to slide along the base in a direction generally parallel to the direction of the axis of said cylinder, one end of the slide member moving from a position to the rear of a depression on said cylinder along said depression and to a position adjacent said guide means, thereby to transfer a hinge from said first position to said second position.

6. The apparatus of claim 1, in which said hinge is a snap hinge comprising a pair of leaves fastened together by a pintle and a snap C-spring engaging said leaves and holding them at an obtuse angle in relationship to each other.

7. The apparatus of claim 1 in which said guide means comprises a face-plate mounted on the base at a predetermined angle thereto, the plane of the plate being approximately parallel to a plane containing the direction of motion of said transfer means.

8. The apparatus of claim 7 in which said guide means comprises a pair of face-plates mounted at an angle to each other and to said base, said transfer means being adapted to move said hinge between said plates, and said second position being located between said plates.

9. The apparatus of claim 1 in which said positioning means comprises a plurality of spaced-apart fingers mounted for motion in a direction vertical to said base and adjacent said guide means, and adapted to grip said hinge at said second position and move it to said third position.

10. The aparatus of claim 1 in which said wiping means comprises a pair of elongated members mounted on said base perpendicular thereto and adjacent said guide means, each of said members being pivoted to move in a plane perpendicular to said base, adjacent ends of said members being adapted to move apart from each other when the other ends of the members are moved toward each other, said adjacent ends having slots therein which fit over said tabs when the hinge has been moved to said third position, and said members being operable to cause said adjacent ends to move apart to wipe said tabs over the hinge to fasten the hinge to said shell.

11. The apparatus of claim 1, in which said control means comprises fluid-operated pistons for operating said transfer means, first positioning means, and wiping means, and a plurality of electrical solenoid-operated valves for operating each of said pistons, said valves being controlled by sequentially-operated electrical switches.

12. The apparatus of claim 11, including switching means connected to said solenoid valves and closable by the fluid operated piston which operates said wiping means after occurrence of the wiping operation, thereby to retract all pistons to a predetermined original position.

13. The apparatus of claim 1, but including second positioning means operable to positon said shells in respect to a predetermined position along said guide means.

14. The apparatus of claim 13, in which the first positioning means is adapted to be operated only after said second positioning means has operated to move said shell to a position to receive correctly a hinge from said transfer means.

15. The apparatus of claim 13 including means operable to move said hinge, at the end of a transfer motion of said transfer means in a direction opposite the direction of said transfer motion, thereby to bring said hinge against a stop member located in a position fixed in relation to said predetermined position.

16. Apparatus for attaching a hinge to a box shell, a wall of the shell being provided with raised tabs and at least one hinge leaf being provided with holes spaced to register with the tabs, comprising:
   a base;
   means on the base for conveying a hinge to a first position;
   guide means on the base for aligning said box shell on the base away from said first position and in a predetermined angular relation to a perpendicular to the base;

pick-up means for moving said hinge from said first position to a second position;

transfer means for moving said hinge from said second position to a third position in which said holes are in alignment with said tabs along said perpendicular;

first positioning means for moving said hinge from said third position to a fourth position in which said hinge is in contact with said wall with the tabs projecting through said holes;

wiping means for bending said tabs over the hinge leaf to fasten the hinge to said walls;

control means for sequentially operating said transfer means, first positioning means, and wiping means, in the order given; and means interlocking with said control means whereby said control means is inoperative to operate said first positioning means and said wiping means until said pick-up means has been operated to place a hinge in said second position, and until said box shell has been aligned on said base by said guide means in position to receive said hinge properly from said first positioning means.

17. The apparatus of claim 16 in which said means for conveying a hinge to a first position is a cylinder rotatable in respect to the base on a horizontal axis, said cylinder having a plurality of depressions around its periphery, and including first magnetic means to hold said hinges in the depressions.

18. The apparatus of claim 17 in which said pick-up means includes a member movable toward and away from the peripheral surface of said cylinder and containing a second magnet whose magnetic field is sufficiently strong to attract a hinge from said rotating means and convey said hinge to said second position.

19. The apparatus of claim 17, including means for detecting a hinge which is improperly positioned in a said depression, and including magnetic means for removing said hinge from said rotating means.

20. The apparatus of claim 16 in which said control means comprises fluid-operated pistons for operating said transfer means, positioning means, and wiping means, and a plurality of electrical solenoid-operated valves for operating each of said pistons, said valves being controlled by sequentially-operated electrical switches.

21. The apparatus of claim 20 in which said pick-up means includes a member movable toward and away from said rotating means, the pick-up member in moving a hinge away from the rotating means to said second position is adapted to close a switch connected in series with a switch controlled by the fluid operated piston adapted to operate said transfer means, and in series with the solenoid valve controlling said piston.

22. The apparatus of claim 21 including adjusting means for positioning said box shell properly on said guide means, and in which operation of the transfer means is adapted to operate a first switch in series with a second switch operable by the positioning means and in series with a third switch operable by a box shell when the latter is positioned on said guide means, said first, second and third switches when closed being adapted to operate said adjusting means.

23. The apparatus of claim 22 in which operation of said adjusting means is adapted to operate at least one switch which is connected in series with that solenoid valve which controls said positioning means.

24. The apparatus of claim 23 including a switch adapted to be operated at the end of the stroke of said positioning means and connected in series with the solenoid valve controlling operation of said wiping means, thereby to cause a wiping motion to bend said tabs to fasten said hinge to said shell.

25. The apparatus of claim 24 including a switch adapted to be operated at the end of the stroke of said wiping means and connected to all of said solenoid valves whereby, when said switch is closed at the end of said stroke, it causes said valves to retract all of said pistons controlled by said valves.

26. Apparatus for attaching a leaf-hinge to a pair of box shells, a wall of each shell being provided with raised tabs and the hinge leaves being provided with holes spaced to register with the tabs, comprising:

a base;

means on the base for conveying a hinge to a first position;

guide means on the base for aligning a pair of said box shells on the base away from said first position and in a predetermined angular relation to a perpendicular to the base and to each other, the edges of the shell walls having tabs being juxtaposed, and opposite shell walls being spaced apart to provide a space between said shells;

transfer means for moving a hinge from said first position to a second position between said shells and in which said holes are in alignment with said tabs;

first positioning means for moving said hinge from said second position to a third position in which the leaves of said hinges are in contact with said walls with the tabs projecting through said holes;

wiping means for bending said tabs over the hinge leaves to fasten the hinge to said walls;

control means for sequentially operating said transfer means, first positioning means, and wiping means, in the order given; and means interlocking with said control means whereby said control means is inoperative to operate said first positioning means and said wiping means until said transfer means has been operated to place a hinge in said second position and said box shells are both aligned properly on the base by said guide means.

27. Apparatus for attaching a leaf-hinge to a pair of box shells, a wall of each shell being provided with raised tabs and the hinge leaves being provided with holes spaced to register with the tabs, comprising:

a base;

means on the base for conveying a hinge to a first position;

guide means on the base for aligning a pair of said box shells on the base away from said first position and in a predetermined angular relation to a perpendicular to the base and to each other, the edges of the shell walls having tabs being juxtaposed, and opposite shell walls being spaced apart to provide a space between said shells;

pick-up means for moving a hinge from said first position to a second position;

transfer means for moving said hinge from said second position to a third position between said shells and in which said holes are in alignment with said tabs;

first positioning means for moving said hinge from said third position to a fourth position in which the leaves of said hinge are in contact with said walls with the tabs projecting through said holes;

wiping means for bending said tabs over the hinge leaves to fasten the hinge to said walls;

control means for sequentially operating said transfer means, first positioning means, and wiping means, in the order given; and means interlocking with said control means whereby said control means is inoperative to operate said first positioning means and said wiping means until said transfer means has been operated to place a hinge in said third position and said box shells are both aligned properly on the base by said guide means.

28. The apparatus of claim 27 in which said means for conveying a hinge to a first position is a cylinder rotatable in respect to the base on a horizontal axis, said cylinder having a plurality of depressions around its periphery each adapted to receive a hinge, and including first magnetic means to hold said hinges in the depressions.

29. The apparatus of claim 28, including means for detecting any said hinge which is improperly positioned in any of said depressions, and including magnetic means for removing said hinge from said depressions.

30. The apparatus of claim 27 in which said pick-up means includes an arm pivoted at one end on the base and having its other end movable toward and away from the peripheral surface of said cylinder, said other end bearing a hinge receiving member containing a second magnet whose magnetic field is sufficiently strong to attract a hinge from a said depression, said receiving member conveying said hinge to said second position.

31. The apparatus of claim 27 in which said control means comprises fluid-operated pistons for operating said transfer means, positioning means, and wiping means, and a plurality of electrical solenoid-operating valves for operating each of said pistons, said valves being controlled by sequentially-operated electrical switches.

32. The apparatus of claim 31 in which said pick-up means, in moving a singe away from said rotating means to said second position, is adapted to close a switch connected in series with a switch controlled by the fluid-operated piston adapted to operate said transfer means, and in series with the solenoid valve controlling said piston.

33. The apparatus of claim 31 including adjusting means for positioning said box shells properly on said guide means, and in which operation of the transfer means is adapted to operate a first switch in series with a second switch operable by the positioning means and in series with a third switch operable by the box shells in conjunction when the latter are positioned on said guide means, said first, second and third switches when closed being adapted to operate said adjusting means.

34. The apparatus of claim 33 in which operation of said adjusting means is adapted to operate at least one fourth switch which is connected in series with that solenoid valve which controls said positioning means.

35. The apparatus of claim 34 including a fifth switch adapted to be operated at the end of the stroke of said positioning means and connected in series with the solenoid valve controlling operation of said wiping means, thereby to cause a wiping motion to bend said tabs to fasten said hinge to said shells.

36. The apparatus of claim 34 including a sixth switch adapted to be operated at the end of the stroke of said wiping means and connected to all of said solenoid valves whereby, when said sixth switch is closed at the end of said stroke, it causes said valves to retract all of said pistons controlled by said valves.

37. In a machine for fastening hinges to box shells to hinge the shells one to the other, and including means for conveying hinges successively from a source thereof to a predetermined position on the machine wherefrom the hinges may be taken for further manipulation, the improvement characterized in that:

said means for conveying hinges is a cylinder rotating on an axis parallel to the direction in which said hinges are taken for said manipulation, the surface of the cylinder being provided with a plurality of depressions, each depression being adapted to receive a hinge lengthwise and lying at a skew angle to the axis of the cylinder; and including hinge receiving means at said predetermined position, said receiving means being elongated and adapted to receive the hinge lengthwise, the length of the receiving means lying parallel to the axis of the cylinder, whereby, when a depression containing a hinge approaches said receiving member, the depression and the hinge therein are at an angle to the receiving member.

References Cited

UNITED STATES PATENTS

| 1,571,429 | 2/1926 | Ney | 29—11 |
| 3,381,358 | 5/1968 | Eitzinger | 29—208 |
| 3,393,444 | 7/1968 | Peters et al. | 29—442 |

THOMAS H. EAGER, Primary Examiner

U.S. Cl. X.R.

29—11, 434

PO-1050
(5/69)

UNITED STATES PATENT OFFICE
CERTIFICATE OF CORRECTION

Patent No. 3,470,599          Dated October 7, 1969

Inventor(s) Joseph O. Burman et al

It is certified that error appears in the above-identified patent and that said Letters Patent are hereby corrected as shown below:

In the claims, column 23, line 61, should read as follows:

conveying a hinge to a first position is a cylinder rotatable

SIGNED AND
SEALED
MAR 10 1970

(SEAL)
Attest:

Edward M. Fletcher, Jr.
Attesting Officer

WILLIAM E. SCHUYLER, JR.
Commissioner of Patents